US012539622B2

(12) United States Patent
Kim et al.

(10) Patent No.: US 12,539,622 B2
(45) Date of Patent: Feb. 3, 2026

(54) ROBOT HAND MODULE

(71) Applicants: Hyundai Motor Company, Seoul (KR); Kia Corporation, Seoul (KR)

(72) Inventors: Beom Su Kim, Yongin-si (KR); Hyun Seop Lim, Anyang-si (KR); Sang In Park, Suwon-si (KR); Ki Hyeon Bae, Hwaseong-si (KR); Kyu Jung Kim, Seoul (KR); Dong Hyun Lee, Uiwang-si (KR); Joo Won Lee, Suwon-si (KR); Hyo Joong Kim, Suwon-si (KR); Dong Jin Hyun, Suwon-si (KR); Ju Young Yoon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 993 days.

(21) Appl. No.: 17/698,261

(22) Filed: Mar. 18, 2022

(65) Prior Publication Data

US 2023/0044228 A1    Feb. 9, 2023

(30) Foreign Application Priority Data

Aug. 3, 2021   (KR) ........................ 10-2021-0102196

(51) Int. Cl.
*B25J 15/00*   (2006.01)
*B25J 9/10*    (2006.01)
(Continued)

(52) U.S. Cl.
CPC ................ *B25J 15/10* (2013.01); *B25J 9/104* (2013.01)

(58) Field of Classification Search
CPC ...... B25J 15/0009; B25J 9/1045; B25J 15/10; B25J 9/08; B25J 9/104; B25J 15/022; B25J 15/08; B25J 15/0233
See application file for complete search history.

(56) References Cited

U.S. PATENT DOCUMENTS 4,364,593 A   12/1982  Maeda
4,946,380 A    8/1990  Lee
(Continued)

FOREIGN PATENT DOCUMENTS

CN     108994864 A    12/2018
IN     108908382 A    11/2018
(Continued)

*Primary Examiner* — Mahdi H Nejad
(74) *Attorney, Agent, or Firm* — SLATER MATSIL, LLP

(57) ABSTRACT

A robot hand module includes a palm part and a thumb module coupled to the palm part, wherein the thumb module includes a thumb phalangeal part movably coupled to the palm part, a thumb cable part having a first side connected to the thumb phalangeal part, and a thumb driving part connected to a second side of the thumb cable part and configured to operate the thumb phalangeal part by extending the thumb cable part to the outside or retracting the thumb cable part, and wherein the thumb phalangeal part includes a thumb pre-tensioner configured to pull the thumb cable part, a first side of the thumb pre-tensioner being fixed relative to the thumb phalangeal part, and a second side of the thumb pre-tensioner being fixed to the thumb cable part.

16 Claims, 20 Drawing Sheets

(51) Int. Cl.
  *B25J 15/08*    (2006.01)
  *B25J 15/10*    (2006.01)

(56)        References Cited

U.S. PATENT DOCUMENTS

| | | | |
|---|---|---|---|
| 5,447,403 | A | 9/1995 | Engler, Jr. |
| 8,052,185 | B2 | 11/2011 | Madhani |
| 8,419,096 | B2 | 4/2013 | Kim et al. |
| 8,424,941 | B2 | 4/2013 | Ihrke et al. |
| 8,747,486 | B2 | 6/2014 | Kawasaki et al. |
| 8,991,884 | B2 | 3/2015 | DeLouis |
| 9,545,727 | B1 | 1/2017 | Shamlian et al. |
| 9,744,677 | B2 * | 8/2017 | Ohm ................ B25J 15/0009 |
| 10,588,758 | B2 | 3/2020 | Poirters |
| 11,279,024 | B2 | 3/2022 | Lee |
| 2005/0121929 | A1 | 6/2005 | Greenhill et al. |
| 2007/0236162 | A1 | 10/2007 | Kawabuchi et al. |
| 2010/0259057 | A1 | 10/2010 | Madhani |
| 2011/0040408 | A1 | 2/2011 | De La Rosa Tames et al. |
| 2011/0163561 | A1 | 7/2011 | Kim et al. |
| 2012/0112485 | A1 | 5/2012 | Lee et al. |
| 2013/0313844 | A1 | 11/2013 | De La Rosa Tames et al. |
| 2014/0117686 | A1 * | 5/2014 | Akae ................ B25J 9/1045 294/106 |
| 2015/0343647 | A1 | 12/2015 | Garcia et al. |
| 2022/0055229 | A1 | 2/2022 | Kim et al. |
| 2022/0297318 | A1 * | 9/2022 | Jamal ................ B25J 13/08 |
| 2023/0038682 | A1 * | 2/2023 | Kim ................ B25J 15/022 |
| 2023/0040751 | A1 * | 2/2023 | Kim ................ B25J 9/1045 |
| 2023/0042573 | A1 * | 2/2023 | Kim ................ B25J 9/08 |
| 2023/0044228 | A1 | 2/2023 | Kim et al. |

FOREIGN PATENT DOCUMENTS

| | | | |
|---|---|---|---|
| JP | 2003220589 | A | 8/2003 |
| JP | 3706655 | B2 | 10/2005 |
| JP | 2005349489 | A | 12/2005 |
| JP | 2010247294 | A | 11/2010 |
| JP | 2010247320 | A | 11/2010 |
| JP | 2011104752 | A | 6/2011 |
| JP | 2011245575 | A | 12/2011 |
| JP | 5286947 | B2 | 9/2013 |
| JP | 5921225 | B2 | 5/2016 |
| KR | 101145295 | B1 | 5/2012 |
| KR | 101167239 | B1 | 7/2012 |
| KR | 101639723 | B1 | 7/2016 |
| KR | 101685997 | B1 | 12/2016 |
| KR | 101770747 | B1 | 8/2017 |
| KR | 20200071184 | A | 6/2020 |
| KR | 20200098941 | A | 8/2020 |
| KR | 20210037980 | A | 4/2021 |
| WO | WO-2017077429 | A1 * | 5/2017 ............. A61F 2/583 |

* cited by examiner

ROBOT HAND MODULE

CROSS-REFERENCE TO RELATED APPLICATIONS

This application claims the benefit of Korean Patent Application No. 10-2021-0102196, filed on Aug. 3, 2021, which application is hereby incorporated herein by reference.

TECHNICAL FIELD

The present disclosure relates to a robot hand module.

BACKGROUND

In the case of a humanoid robot having a structure shaped similarly to a person among robots, it is essential to develop a structure capable of implementing a motion identical to a human motion. In particular, there is a need to develop a structure capable of implementing a motion identical to a motion of a human joint to manufacture the humanoid robot. Examples of components provided in the humanoid robot to implement the human motion may include a robot hand module capable of mimicking a motion of a joint of a human hand.

However, in the case of the robot hand module in the related art, the components are mainly configured as hard links to ensure rigidity of the robot hand module, which makes it difficult to reduce the weight and size of the robot hand module. In addition, in the case of the robot hand module to which a wire is applied to reduce the weight and size of the robot hand module, the wire may be damaged during a process of rotating a joint, which causes a deterioration in durability of the robot hand module. Therefore, there is a need for a robot hand module having a novel structure capable of solving the above-mentioned problems.

SUMMARY

The present disclosure relates to a robot hand module. Particular embodiments relate to a robot hand module having a structure capable of implementing a motion of a human hand.

Embodiments of the present disclosure can provide a robot hand module having a novel structure capable of reducing the weight and size of the robot hand module and implementing a motion similar to a motion of a human hand.

An exemplary embodiment of the present disclosure provides a robot hand module including a thumb module and a palm part to which the thumb module is coupled, in which the thumb module includes a thumb phalangeal part movably coupled to the palm part, a thumb cable part having one side connected to the thumb phalangeal part, and a thumb driving part connected to the other side of the thumb cable part and configured to operate the thumb phalangeal part by extending the thumb cable part to the outside or retracting the thumb cable part, and in which the thumb phalangeal part includes a thumb pre-tensioner configured to pull the thumb cable part, one side of the thumb pre-tensioner being fixed relative to the thumb phalangeal part, and the other side of the thumb pre-tensioner being fixed to the thumb cable part.

When tension of the thumb cable decreases, the other side of the thumb pre-tensioner may move toward one side of the thumb pre-tensioner.

The thumb pre-tensioner may include a spring member having one end portion fixed to the thumb phalangeal part.

The thumb pre-tensioner may further include a catching member coupled to the other end portion of the spring member and configured to be in contact with a part of the thumb cable part, and the thumb cable part may be in contact with a region of the catching member that faces the other end portion of the spring member.

A space portion, in which the catching member is movably disposed, may be defined in the thumb phalangeal part and extend in a longitudinal direction thereof which is a direction in which the spring member extends.

The space portion may extend in the longitudinal direction oblique with respect to a direction in which the thumb phalangeal part extends.

The thumb phalangeal part may include a first thumb phalangeal member disposed adjacent to the palm part, a second thumb phalangeal member having one side rotatably coupled to the first thumb phalangeal member, a third thumb phalangeal member having one side rotatably coupled to the second thumb phalangeal member, a fourth thumb phalangeal member having one side rotatably coupled to the third thumb phalangeal member, and a thumb insertion member having one side coupled to the first thumb phalangeal member and the other side inserted and coupled into the palm part, and the thumb pre-tensioner may be disposed in the second thumb phalangeal member.

Another exemplary embodiment of the present disclosure provides a robot hand module including a finger module and a palm part to which the finger module is coupled, in which the finger module includes a finger phalangeal part movably coupled to the palm part, a finger cable part having one side coupled to the finger phalangeal part, and a finger driving part connected to the other side of the finger cable part and configured to operate the finger phalangeal part by extending the finger cable part to the outside or retracting the finger cable part, and in which the finger phalangeal part includes a finger pre-tensioner configured to pull the finger cable part, one side of the finger pre-tensioner being fixed relative to the finger phalangeal part, and the other side of the finger pre-tensioner being fixed to the finger cable part.

When tension of the finger cable decreases, the other side of the finger pre-tensioner may move toward one side of the finger pre-tensioner.

The finger pre-tensioner may include a spring member having one end portion fixed relative to the finger phalangeal part.

The finger pre-tensioner may further include a catching member coupled to the other end portion of the spring member and configured to be in contact with a part of the finger cable part, and the finger cable part may be in contact with a region of the catching member that faces the other end portion of the spring member.

A space portion, in which the catching member is movably disposed, may be defined in the finger phalangeal part and extend in a longitudinal direction thereof which is a direction in which the spring member extends.

The space portion may extend in the longitudinal direction that intersects a direction in which the finger phalangeal part extends.

The spring member may include a first region disposed in the space portion and having one end portion fixed to the catching member and a second region bent at a predetermined angle with respect to the first region and having one end portion fixed relative to the finger phalangeal part.

A width of a section, in the space portion, in which the first region and the second region meet together may be smaller than a width of another section.

The finger phalangeal part may include a first finger phalangeal member disposed adjacent to the palm part, a second finger phalangeal member having one side rotatably coupled to the first finger phalangeal member, a third finger phalangeal member having one side rotatably coupled to the second finger phalangeal member, and a finger insertion member having one side coupled to the first finger phalangeal member and the other side inserted and coupled into the palm part, and the finger pre-tensioner may be disposed in the finger insertion member.

According to embodiments of the present disclosure, it is possible to provide the robot hand module having the novel structure capable of reducing the weight and size of the robot hand module and implementing the motion similar to the motion of the human hand.

DETAILED DESCRIPTION OF ILLUSTRATIVE EMBODIMENTS

Hereinafter, a structure of a robot hand module according to embodiments of the present disclosure will be described below with reference to the drawings.

Figure 1:
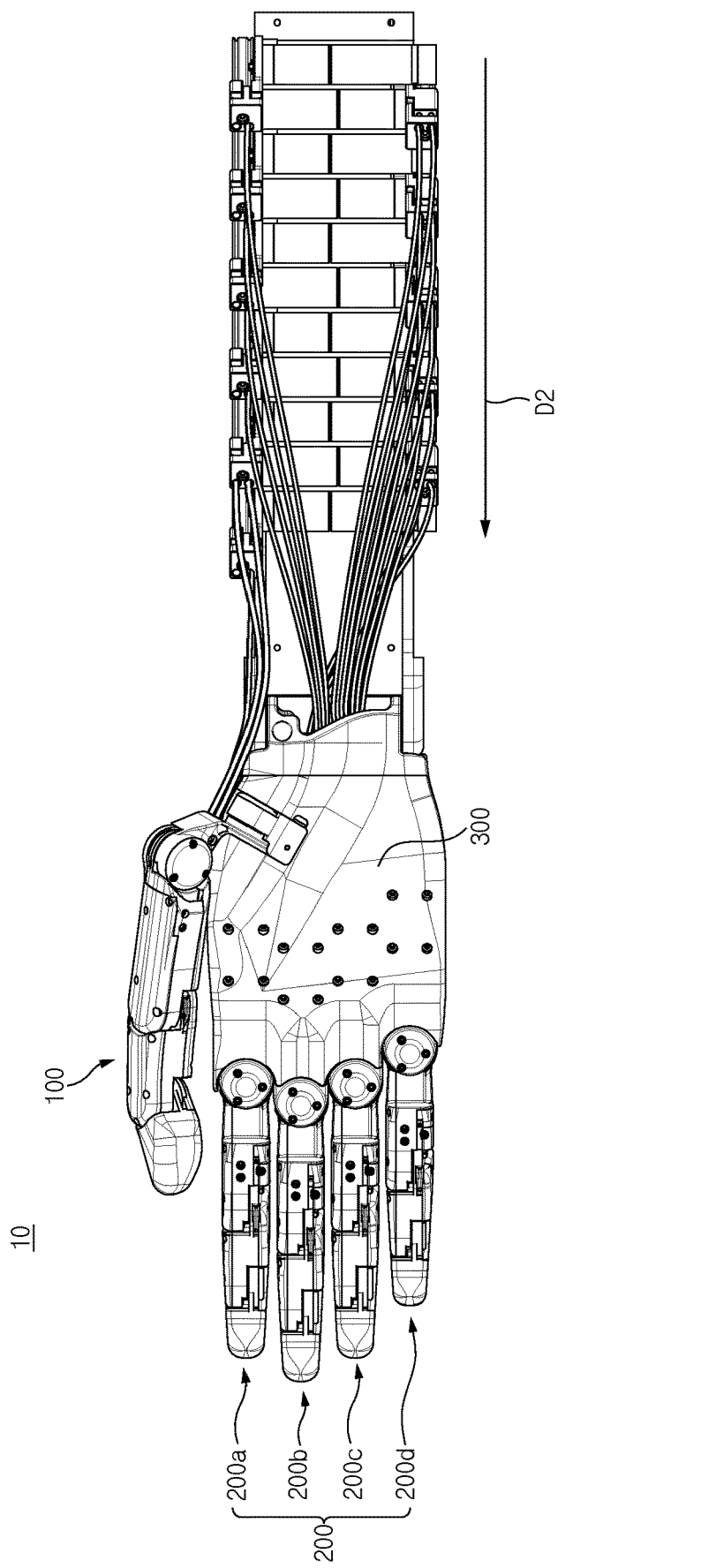
FIG. 1 is a top plan view illustrating a robot hand module according to embodiments of the present disclosure.
Figure 2:
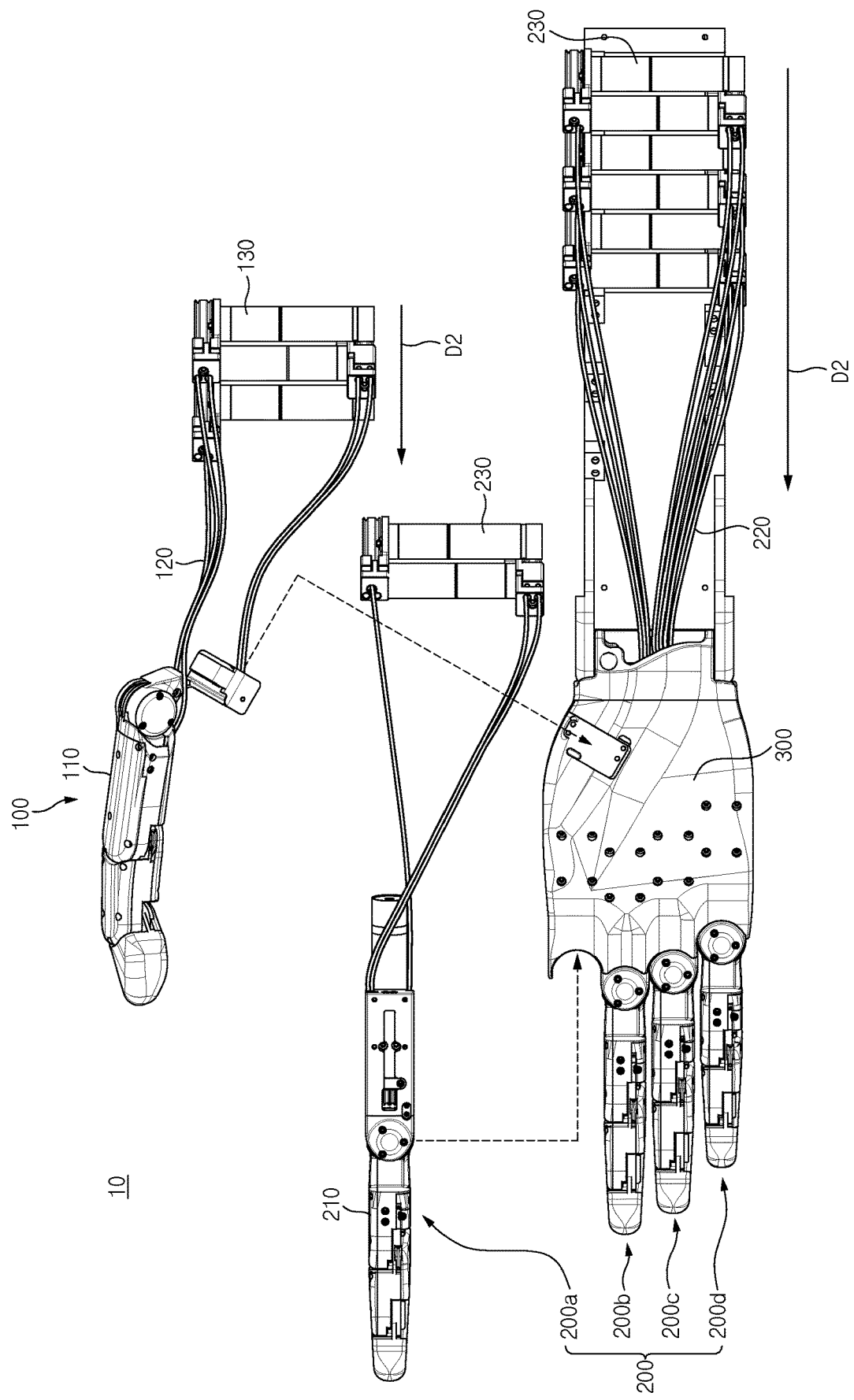
FIG. 2 is a top plan view illustrating a state in which a thumb module and some finger modules are disassembled from the robot hand module according to embodiments of the present disclosure.
Figure 3:
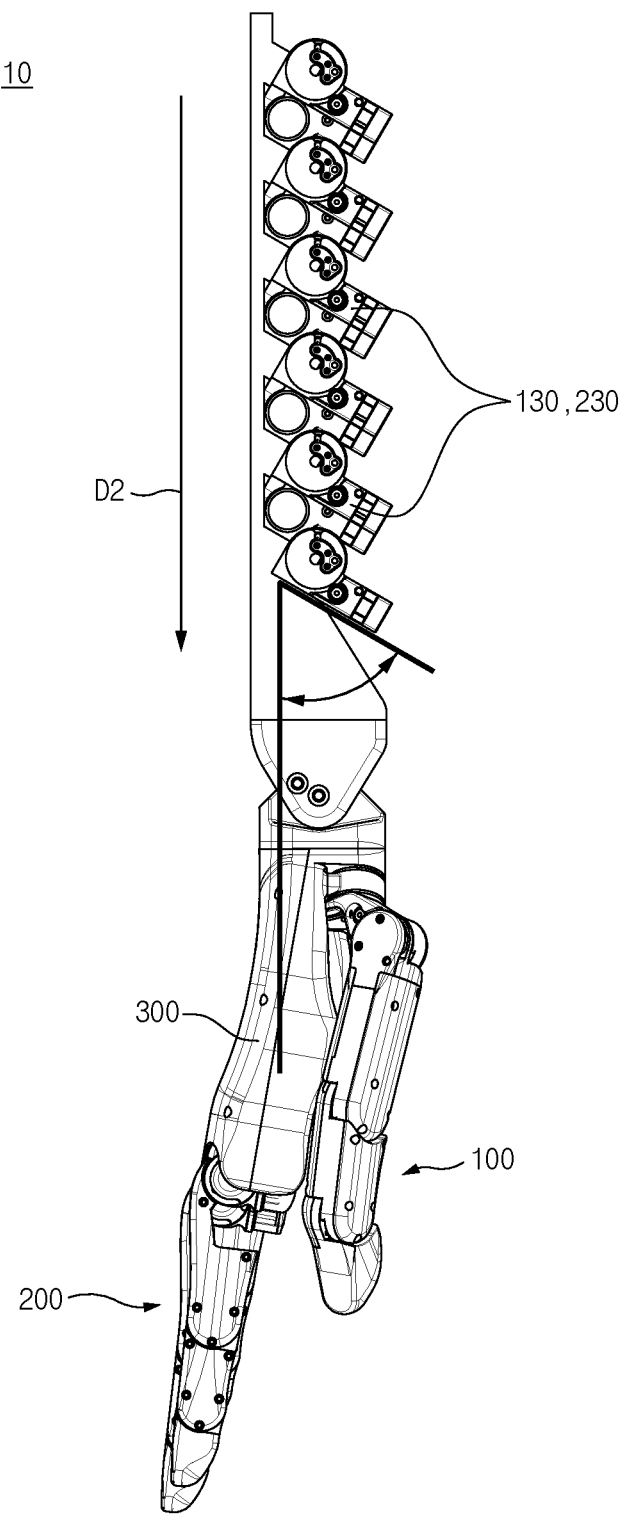
FIG. 3 is a side view illustrating the robot hand module according to embodiments of the present disclosure.
Figure 4:
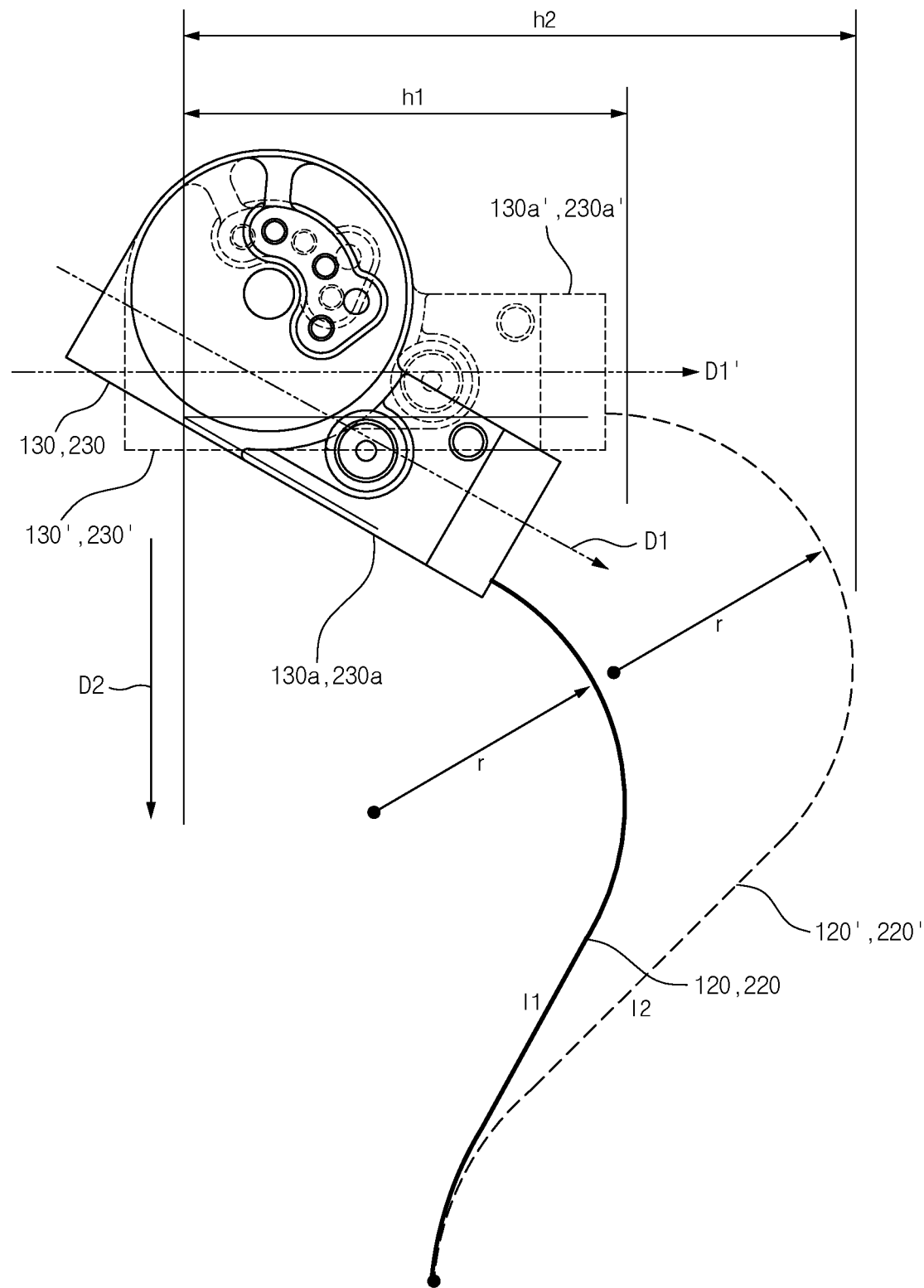
FIG. 4 is a side view illustrating arrangement angles of a thumb driving part and a finger driving part provided in the robot hand module according to embodiments of the present disclosure and an arrangement angle of a driving part of a comparative example.

FIG. 1 is a top plan view illustrating a robot hand module according to embodiments of the present disclosure, and FIG. 2 is a top plan view illustrating a state in which a thumb module and some finger modules are disassembled from the robot hand module according to embodiments of the present disclosure. In addition, FIG. 3 is a side view illustrating the robot hand module according to embodiments of the present disclosure, and FIG. 4 is a side view illustrating arrangement angles of a thumb driving part and a finger driving part provided in the robot hand module according to embodiments of the present disclosure and an arrangement angle of a driving part of a comparative example.

A robot hand module lo according to embodiments of the present disclosure may have a structure capable of mimicking a motion of a human hand. For example, the robot hand module lo may be provided in a humanoid robot.

Meanwhile, in the present specification, a thumb, and the other fingers, except for the thumb, will be separately described. That is, according to embodiments of the present specification, the fingers may be understood as including an index finger, a middle finger, a ring finger, and a little finger but excluding the thumb.

The robot hand module lo according to embodiments of the present disclosure may include a thumb module 100 configured to mimic a motion of a human thumb, finger modules 200 configured to mimic motions of human fingers, and a palm part 300 to which the thumb module 100 and the finger modules 200 are coupled. The robot hand module 10 may include a single thumb module and four finger modules. The four finger modules may be configured to mimic the motions of the index finger, the middle finger, the ring finger, and the little finger, respectively.

The thumb module 100 may include a thumb phalangeal part 110 movably coupled to the palm part 300, a thumb cable part 120 having one side coupled to the thumb phalangeal part 110, and a thumb driving part 130 connected to the other side of the thumb cable part 120 and configured to operate the thumb phalangeal part 110 by extending the thumb cable part 120 to the outside or retracting the thumb cable part 120.

The finger module 200 may include a finger phalangeal part 210 movably coupled to the palm part 300, a finger cable part 220 having one side connected to the finger phalangeal part 210, and a finger driving part 230 connected to the other side of the finger cable part 220 and configured to operate the finger phalangeal part 210 by extending the finger cable part 220 to the outside or retracting the finger cable part 220. Meanwhile, the finger modules 200 may include an index finger module 200a, a middle finger module 200b, a ring finger module 200c, and a little finger module 200d. Meanwhile, the thumb driving part 130 and the finger driving part 230 may each be provided in plural. In addition, the thumb driving part 130 and the finger driving parts 230 may be disposed at a position corresponding to a forearm of a human hand.

According to embodiments of the present disclosure, the driving parts 130 and 230 may each control the motion of each of the phalangeal parts 110 and 210 using tension of the cable part by extending the cable part to the outside or retracting the cable part. In this case, the thumb phalangeal part 110 and the finger phalangeal parts 210 may implement bending/stretching motions and extension motions of the human thumb and the human fingers.

Meanwhile, referring to FIGS. 3 and 4, the driving part 130 may include an inlet region 130a through which the cable part 120 is extended to the outside, and the driving part 230 may include an inlet region 230a through which the cable part 220 is extended to the outside. In embodiments of the present specification, reference numeral 130a indicates the inlet region provided in the thumb driving part 130, and reference numeral 230a indicates the inlet region provided in the finger driving part 230.

In this case, according to embodiments of the present disclosure, an acute angle may be defined between a direction D1 in which the inlet regions 130a and 230a are directed toward the outside and a direction D2 in which the plurality of driving parts is disposed.

Referring to FIGS. 3 and 4, a height h2 occupied by the driving part in the robot hand module is relatively large in a case in which a right angle is defined between a direction D1' in which an inlet region 130a' or 230a' provided in the driving part is directed toward the outside and the direction D2 in which the plurality of driving parts 130' and 230' is disposed. In addition, a radius of curvature of a cable part 120' or 220' extended from the inlet region 130a' or 230a' increases, and as a result, the cable part 120' or 220' has a length of l2 in the vicinity of the inlet region. This means that friction occurring on the cable part increases during the process of operating the driving part, which causes a deterioration in efficiency in transmitting power for operating the driving part. Furthermore, the cable part 120' or 220' is greatly bent to be extended to the phalangeal part, which may adversely affect the durability of the cable part 120' or 220'.

However, according to embodiments of the present disclosure, the height h1 occupied by the driving part 130 or 230 in the robot hand module significantly decreases when an acute angle is defined between the directions D1 and D2. Therefore, this configuration may be advantageous in reducing the size of the robot hand module. Furthermore, according to embodiments of the present disclosure, a radius of curvature of the cable part 120 or 220 extended from the inlet region 130a or 230a decreases, such that the cable part 120 or 220 has a length of l1 shorter than the length of l2 in the vicinity of the inlet region 130a or 230a. Therefore, according to embodiments of the present disclosure, the friction occurring on the cable part decreases during the process of operating the driving part, which makes it possible to improve the efficiency in transmitting the power for operating the driving part. Therefore, it is possible to smoothly operate the robot hand module even though a driving part having a low output is mounted, and as a result, it is possible to reduce the size of the robot hand module. Furthermore, a degree to which the cable part 120 or 220 is bent to be extended to the phalangeal part 110 or 220 decreases, which is advantageous in improving the durability of the cable part 120 or 220. For example, the acute angle may be 20 degrees to 70 degrees, but embodiments of the present disclosure are not limited to the magnitude of the acute angle.

Meanwhile, as illustrated in FIGS. 1 and 2, the thumb phalangeal part 110 and the finger phalangeal parts 210 may be coupled to a front end portion of the palm part 300. In addition, the thumb driving part 130 and the finger driving parts 230 may face a rear end portion of the palm part 300.

In addition, since the thumb module loo and the finger modules 200 respectively have the thumb driving part 130 and the finger driving parts 230, the robot hand module 10 may have the plurality of driving parts. In this case, according to embodiments of the present disclosure, the thumb driving part 130, which is the driving part provided in the thumb module 100, and at least one of the finger driving parts 230, which are the driving parts respectively provided in the finger modules 200, may be disposed side by side. In addition, the driving part provided in the index finger module 200a is an index finger driving part, the driving part provided in the middle finger module 200b is a middle finger driving part, the driving part provided in the ring finger module 200c is a ring finger driving part, and the driving part provided in the little finger module 200d is a little finger driving part. The index finger driving part, the middle finger driving part, the ring finger driving part, and the little finger driving part may be disposed side by side. More particularly, all of the thumb driving part, the index finger driving part, the middle finger driving part, the ring finger driving part, and the little finger driving part may be disposed side by side. In this case, whether the driving parts are disposed side by side may be determined based on whether the inlet regions respectively provided in the driving parts are disposed side by side.

More particularly, a distance between the thumb driving part 130 and the palm part 300 may be shorter than a distance between the finger driving part 230 and the palm part 300.

In the case of the human hand, a force of the thumb grasping an object is higher than a force of a finger grasping an object. Therefore, in order for the robot hand module 10 according to embodiments of the present disclosure to more realistically mimic the motion of the human hand, a force of the thumb module 100 grasping an object needs to be higher than a force of the finger module 200 grasping an object. To this end, it is necessary to minimize a loss of power caused by friction occurring on the thumb cable part 120 provided in the thumb module 100.

Therefore, according to embodiments of the present disclosure, the distance between the thumb driving part 130 and the palm part 300 is shorter than the distance between the finger driving part 230 and the palm part 300. Therefore, it is possible to minimize a length of the thumb cable part 120 and thus minimize friction occurring on the thumb cable part 120, thereby maximizing the force for grasping an object at the time of operating the thumb module 100.

In addition, according to embodiments of the present disclosure, a distance between the index finger driving part and the palm part 300 may be shorter than a distance between the middle finger driving part and the palm part 300, and a distance between the middle finger driving part and the palm part 300 may be shorter than a distance between the ring finger driving part and the palm part 300.

In addition, a distance between the ring finger driving part and the palm part 300 may be shorter than a distance between the little finger driving part and the palm part 300. In this case, even though the index finger driving part, the middle finger driving part, the ring finger driving part, and the little finger driving part have the same output, a force of the index finger module 200a grasping an object may be higher than a force of the middle finger module 200b grasping an object, a force of the middle finger module 200b grasping an object may be higher than a force of the ring finger module 200c grasping an object, and a force of the ring finger module 200c grasping an object may be higher than a force of the little finger module 200d grasping an object.

In addition, more particularly, according to embodiments of the present disclosure, the same angle may be defined between the direction D1 in which the inlet regions 130a and 230a of the driving parts respectively provided in the thumb module 100, the index finger module 200a, the middle finger module 200b, the ring finger module 200c, and the little finger module 200d are directed toward the outside and the direction D2 in which the plurality of driving parts is disposed.

Figure 5:
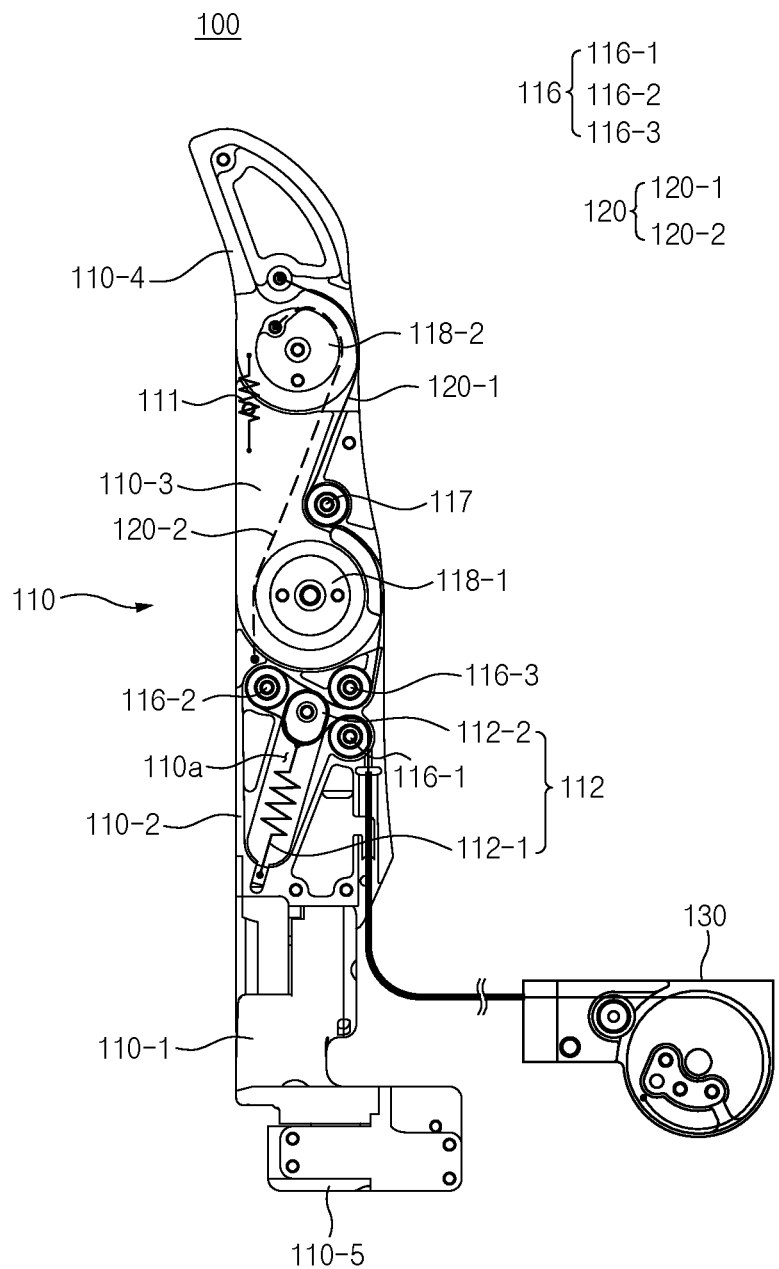
FIG. 5 is a cross-sectional view illustrating a structure of the thumb module provided in the robot hand module according to embodiments of the present disclosure.
Figure 6:
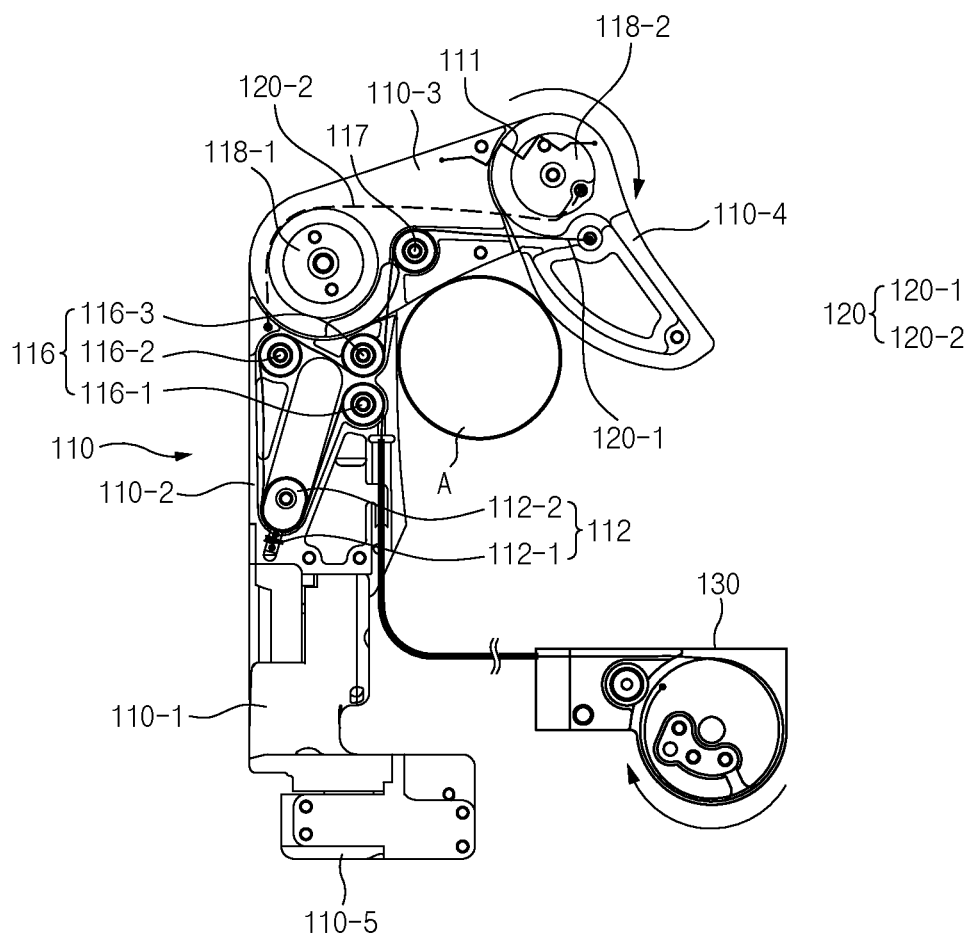
FIG. 6 is a cross-sectional view illustrating a state in which an object is grasped by the thumb module provided in the robot hand module according to embodiments of the present disclosure.
Figure 7:
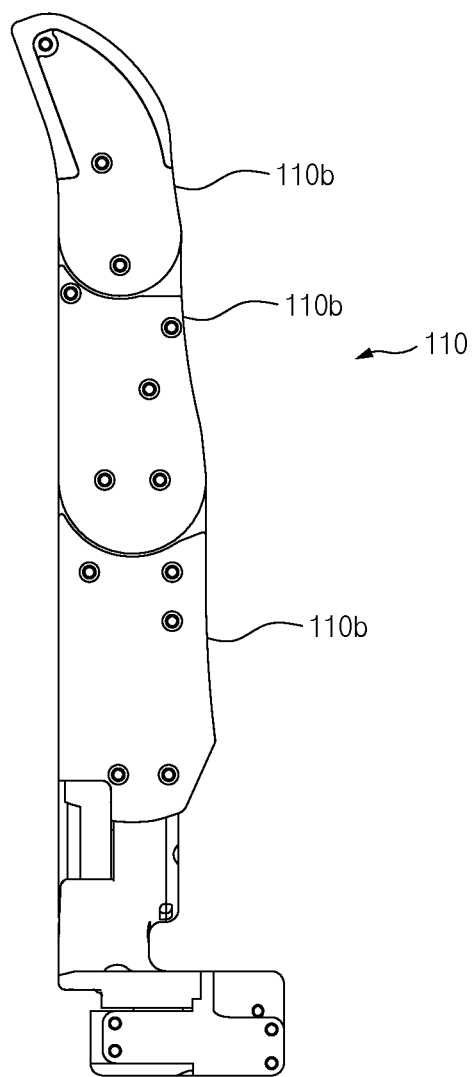
FIG. 7 is a side view illustrating a structure of the thumb module provided in the robot hand module according to embodiments of the present disclosure.

FIG. 5 is a cross-sectional view illustrating a structure of the thumb module provided in the robot hand module according to embodiments of the present disclosure, and FIG. 6 is a cross-sectional view illustrating a state in which an object is grasped by the thumb module provided in the robot hand module according to embodiments of the present disclosure. In addition, FIG. 7 is a side view illustrating a structure of the thumb module provided in the robot hand module according to embodiments of the present disclosure.

The thumb cable part 120 provided in the thumb module 100 may include a first thumb cable 120-1 extended from the thumb driving part 130 and having one side fixed in the thumb phalangeal part 110, and a second thumb cable 120-2 having one side and the other side respectively fixed in the thumb phalangeal part 110. The first thumb cable 120-1 and the second thumb cable 120-2 are configured to implement the bending/stretching motion and the extension motion of the thumb phalangeal part 110 and allow the motions of a plurality of phalangeal members provided in the thumb phalangeal part 110 to be interlocked to one another. Therefore, the first thumb cable 120-1 and the second thumb cable 120-2 may be configured to allow the single thumb driving part 130 to implement the motions of the plurality of phalangeal members, thereby implementing an underactuated mechanism of the thumb module 100. In addition, as described below, even though some of the plurality of phalangeal members interfere with an object and stop moving due to the bending/stretching motion of the thumb phalangeal part 110 when the thumb module 100 grasps the object, the first thumb cable 120-1 enables the remaining phalangeal members to continuously perform the bending/stretching motion, thereby allowing the thumb module 100 to effectively grasp the object. For example, the first thumb cable 120-1 may be configured to enable the thumb module 100 to implement a conformal grip.

Continuing to refer to FIGS. 5 and 6, the thumb phalangeal part 110 may include a first thumb phalangeal member 110-1 provided adjacent to the palm part 300, a second thumb phalangeal member 110-2 having one side rotatably coupled to the first thumb phalangeal member 110-1, a third thumb phalangeal member 110-3 having one side rotatably coupled to the second thumb phalangeal member 110-2, a fourth thumb phalangeal member 110-4 having one side rotatably coupled to the third thumb phalangeal member 110-3, and a thumb insertion member 110-5 having one side coupled to the first thumb phalangeal member 110-1 and the other side inserted and coupled into the palm part 300. In more detail, the fourth thumb phalangeal member 110-4 of the thumb phalangeal part 110 may be disposed farthest from the palm part 300, and the third thumb phalangeal member 110-3, the second thumb phalangeal member 110-2, and the first thumb phalangeal member 110-1 may be disposed in this order in the direction toward the palm part 300. Meanwhile, one end portion of the second thumb cable 120-2 may be fixed in the second thumb phalangeal member 110-2, and the other end portion of the second thumb cable 120-2 may be fixed in the fourth thumb phalangeal member 110-4.

In this case, referring to FIGS. 5 and 6, a direction in which the fourth thumb phalangeal member 110-4 rotates relative to the third thumb phalangeal member 110-3 and a direction in which the third thumb phalangeal member 110-3 rotates relative to the second thumb phalangeal member 110-2 may be perpendicular to a direction in which the second thumb phalangeal member 110-2 rotates relative to the first thumb phalangeal member 110-1. In addition, the direction in which the second thumb phalangeal member 110-2 rotates relative to the first thumb phalangeal member 110-1 may be perpendicular to a direction in which the first thumb phalangeal member 110-1 rotates relative to the thumb insertion member 110-5. In addition, the direction in which the fourth thumb phalangeal member 110-4 rotates relative to the third thumb phalangeal member 110-3 and the direction in which the third thumb phalangeal member 110-3 rotates relative to the second thumb phalangeal member 110-2 may be perpendicular to the direction in which the first thumb phalangeal member 110-1 rotates relative to the thumb insertion member 110-5.

That is, for example, the description will be made with reference to the concept of an x-axis, a y-axis, and a z-axis which are imaginary axes perpendicular to one another. A rotation center axis about which the fourth thumb phalangeal member 110-4 rotates relative to the third thumb phalangeal member 110-3 and a rotation center axis about which the third thumb phalangeal member 110-3 rotates relative to the second thumb phalangeal member 110-2 may be parallel to the x-axis. A rotation center axis about which the second thumb phalangeal member 110-2 rotates relative to the first thumb phalangeal member 110-1 may be parallel to the y-axis. A rotation center axis about which the first thumb phalangeal member 110-1 rotates relative to the thumb insertion member 110-5 may be parallel to the z-axis.

Continuing to refer to FIGS. 5 and 6, the thumb phalangeal part 110 may include first thumb pulleys 116 disposed in the second thumb phalangeal member 110-2, and a second thumb pulley 117 disposed in the third thumb phalangeal member 110-3. The first thumb pulley 116 and the second thumb pulley 117 are configured to be in contact with the first thumb cable 120-1. The first thumb pulley 116 and the second thumb pulley 117 may be configured to support the first thumb cable 120-1 so that the first thumb cable 120-1 may extend along an optimized route to implement the bending/stretching motion of the thumb phalangeal part 110. The first thumb pulley 116 and the second thumb pulley 117 may be configured to move the first thumb cable 120-1 in a state in which predetermined tension is applied to the first thumb cable 120-1 during the process in which the first thumb cable 120-1 is extended or retracted by the thumb driving part 130. The first thumb pulley 116 and the second thumb pulley 117 may each be provided to be rotatable about a stationary rotary shaft.

In more detail, the first thumb pulleys 116 may include a first-1 thumb pulley 116-1, a first-2 thumb pulley 116-2 disposed between the first-1 thumb pulley 116-1 and the second thumb pulley 117 based on the direction in which the first thumb cable 120-1 extends, and a first-3 thumb pulley 116-3 disposed between the first-2 thumb pulley 116-2 and the second thumb pulley 117 based on the direction in which the first thumb cable 120-1 extends. In this case, according to embodiments of the present disclosure, the first thumb cable 120-1 may be fixed at one side of the fourth thumb phalangeal member 110-4 in a state in which the first thumb cable 120-1 is in contact with the first-1 thumb pulley 116-1, the first-2 thumb pulley 116-2, the first-3 thumb pulley 116-3, and the second thumb pulley 117. FIGS. 5 and 6 illustrate an example in which the first-1 thumb pulley 116-1 and the first-3 thumb pulley 116-3 are disposed in the right region in the second thumb phalangeal member 110-2, the first-2 thumb pulley 116-2 is disposed in the left region in the second thumb phalangeal member 110-2, and the first-3 thumb pulley 116-3 is disposed above the first-1 thumb pulley 116-1.

In more detail, referring to the shape made by cutting the thumb phalangeal part 110 in the direction in which the first to fourth thumb phalangeal members 110-1, 110-2, 110-3, and 110-4 are disposed, the first thumb cable 120-1 may be bent counterclockwise based on the region being in contact with the first-1 thumb pulley 116-1 and then extend toward the first-2 thumb pulley 116-2, the first thumb cable 120-1 may be bent clockwise based on the region being in contact with the first-2 thumb pulley 116-2 and then extend toward the second thumb pulley 117 or the first-3 thumb pulley 116-3, the first thumb cable 120-1 may be bent counterclockwise based on the region being in contact with the first-3 thumb pulley 116-3 and then extend toward the second thumb pulley 117, and the first thumb cable 120-1 may be bent clockwise based on the region being in contact with the second thumb pulley 117 and then extend toward the fourth thumb phalangeal member 110-4.

Continuing to refer to FIGS. 5 and 6, the thumb phalangeal part 110 may further include a first thumb joint region 118-1 which is disposed in a region in which the second thumb phalangeal member 110-2 and the third thumb phalangeal member 110-3 are coupled to each other and in which the second thumb phalangeal member 110-2 and the third thumb phalangeal member 110-3 are provided to be rotatable relative to each other, and a second thumb joint region 118-2 which is disposed in a region in which the third thumb phalangeal member 110-3 and the fourth thumb phalangeal member 110-4 are coupled to each other and in which the third thumb phalangeal member 110-3 and the fourth thumb phalangeal member 110-4 are provided to be rotatable relative to each other. Joint regions may be provided in the region in which the first thumb phalangeal member 110-1 and the second thumb phalangeal member 110-2 are coupled to each other and the region in which the thumb insertion member 110-5 and the first thumb phalangeal member 110-1 are coupled to each other. However, in embodiments of the present specification, separate reference numerals are not assigned to the joint regions.

In this case, according to embodiments of the present disclosure, the first thumb cable 120-1 may be in contact with the first thumb joint region 118-1 or the second thumb joint region 118-2. More particularly, the first thumb cable 120-1 may be in contact with the first thumb joint region 118-1 and the second thumb joint region 118-2.

In more detail, referring to the shape made by cutting the thumb phalangeal part 110 in the direction in which the first to fourth thumb phalangeal members 110-1, 110-2, 110-3, and 110-4 are disposed, the first thumb cable 120-1 may be bent counterclockwise based on the region being in contact with the first thumb joint region 118-1 and then extend toward the second thumb pulley 117, and the first thumb cable 120-1 may be bent counterclockwise based on the region being in contact with the second thumb joint region 118-2 and then extend toward the fourth thumb phalangeal member 110-4.

Meanwhile, as described above, one end portion of the first thumb cable 120-1 may be fixed in the thumb phalangeal part 110. In more detail, as illustrated in FIGS. 5 and 6, one end portion of the first thumb cable 120-1 may be fixed in the fourth thumb phalangeal member 110-4. This is to implement the underactuated mechanism and the conformal grip by allowing the second to fourth thumb phalangeal members 110-2, 110-3, and 110-4 to move together during the process of extending or retracting the first thumb cable 120-1.

Meanwhile, like the first thumb cable 120-1, the second thumb cable 120-2 may also be in contact with the first thumb joint region 118-1 or the second thumb joint region 118-2. More particularly, the second thumb cable 120-2 may be in contact with the first thumb joint region 118-1 and the second thumb joint region 118-2.

In more detail, referring to the shape made by cutting the thumb phalangeal part 110 in the direction in which the first to fourth thumb phalangeal members 110-1, 110-2, 110-3, and 110-4 are disposed, the second thumb cable 120-2 may be bent clockwise based on the region being in contact with the first thumb joint region 118-1 and then extend toward the second thumb joint region 118-2, and the second thumb cable 120-2 may be bent counterclockwise based on the region being in contact with the second thumb joint region 118-2 and then fixed in the fourth thumb phalangeal member 110-4. Therefore, as illustrated in FIGS. 5 and 6, the region being in contact with the first thumb cable 120-1 in the first thumb joint region 118-1 and the region being in contact with the second thumb cable 120-2 in the first thumb joint region 118-1 may face each other with the first thumb joint region 118-1 interposed therebetween. Both the region being in contact with the first thumb cable 120-1 in the second thumb joint region 118-2 and the region being in contact with the second thumb cable 120-2 in the second thumb joint region 118-2 may be disposed at one side of the second thumb joint region 118-2.

Meanwhile, unlike the first thumb cable 120-1, the second thumb cable 120-2 may be spaced apart from the first thumb pulleys 116 and the second thumb pulley 117. Therefore, the second thumb cable 120-2 may not be in contact with the first thumb pulley 116 and the second thumb pulley 117.

In addition, according to embodiments of the present disclosure, the thumb phalangeal part 110 may further include a thumb elastic member 111 having one end portion fixed in the third thumb phalangeal member 110-3 and the other opposite end portion fixed in the fourth thumb phalangeal member 110-4 and configured to provide a rotational restoring force when the fourth thumb phalangeal member 110-4 rotates relative to the third thumb phalangeal member 110-3. The thumb elastic member 111 may be configured to implement the extension motion that enables the thumb phalangeal part 110 to return to a state before the bending/stretching motion by rotating the fourth thumb phalangeal member 110-4 relative to the third thumb phalangeal member 110-3 when the bending/stretching motion of the thumb phalangeal part 110 is ended. For example, the thumb elastic member 111 may be a spring member.

Meanwhile, referring to FIG. 7, according to embodiments of the present disclosure, thumb concave regions 110b, which are concavely formed, may be respectively disposed on inner surfaces of the second to fourth thumb phalangeal members 110-2, 110-3, and 110-4 in the direction in which the second to fourth thumb phalangeal members 110-2, 110-3, and 110-4 are bent. The thumb concave regions 110b may increase a contact area between the thumb phalangeal part 110 and an object when the thumb phalangeal part 110 grasps the object by performing the bending/stretching motion, thereby allowing the thumb phalangeal part 110 to more stably grasp the object.

A method of operating the thumb phalangeal part 110 of the robot hand module 10 according to embodiments of the present disclosure will be described below with reference to FIGS. 5 to 7.

As illustrated in FIG. 5, when the thumb driving part 130 operates to retract the first thumb cable 120-1 in the state in which the thumb phalangeal part 110 is unfolded, the first thumb cable 120-1 is retracted to the thumb driving part 130 through a route extending along the second thumb joint region 118-2, the second thumb pulley 117, the first thumb joint region 118-1, the first-3 thumb pulley 116-3, the first-2 thumb pulley 116-2, and the first-1 thumb pulley 116-1. In this case, the length of the first thumb cable 120-1 in the thumb phalangeal part 110 decreases as the first thumb cable 120-1 is retracted. Therefore, the thumb phalangeal part 110 performs the bending/stretching motion by means of: (i) the interference between the first thumb cable 120-1 and the first thumb pulley 116, the second thumb pulley 117, the first thumb joint region 118-1, and the second thumb joint region 118-2; (ii) the rotational motion between the second thumb phalangeal member 110-2 and the third thumb phalangeal member 110-3 in the first thumb joint region 118-1; and (iii) the rotational motion between the third thumb phalangeal member 110-3 and the fourth thumb phalangeal member 110-4 in the second thumb joint region 118-2. In particular, according to embodiments of the present disclosure, the thumb cable part 120 includes not only the first thumb cable 120-1, but also the second thumb cable 120-2 which has one end portion and the other end portion respectively fixed to the second thumb phalangeal member 110-2 and the fourth thumb phalangeal member 110-4 and is bent in the regions respectively being in contact with the first thumb joint region 118-1 and the second thumb joint region 118-2. Therefore, the motions of the first thumb joint region 118-1 and the second thumb joint region 118-2 may be synchronized during the bending/stretching process of the thumb phalangeal part 110. Therefore, the plurality of thumb phalangeal members may be moved by the operation of the single thumb driving part 130, thereby implementing the underactuated mechanism.

Meanwhile, as illustrated in FIG. 6, in order for the thumb module 100 to grasp an object A, the thumb phalangeal part 110 may perform the bending/stretching motion so that all of the second thumb phalangeal member 110-2, the third thumb phalangeal member 110-3, and the fourth thumb phalangeal member 110-4 press the object A. Therefore, even though the second thumb phalangeal member 110-2 and the third thumb phalangeal member 110-3 press the object A first and thus the second thumb phalangeal member 110-2 and the third thumb phalangeal member 110-3 are stopped during the bending/stretching process of the thumb phalangeal part 110, the fourth thumb phalangeal member 110-4 needs to continuously rotate relative to the third thumb phalangeal member 110-3.

In this case, according to embodiments of the present disclosure described above, since the end portion of the first thumb cable 120-1 is fixed in the fourth thumb phalangeal member 110-4, the fourth thumb phalangeal member 110-4 may consistently rotate until the fourth thumb phalangeal member 110-4 presses the object A even though the second thumb phalangeal member 110-2 and the third thumb phalangeal member 110-3 are stopped. Therefore, according to embodiments of the present disclosure, the thumb phalangeal part 110 may effectively grasp the object A by means of the conformal grip.

Figure 8:
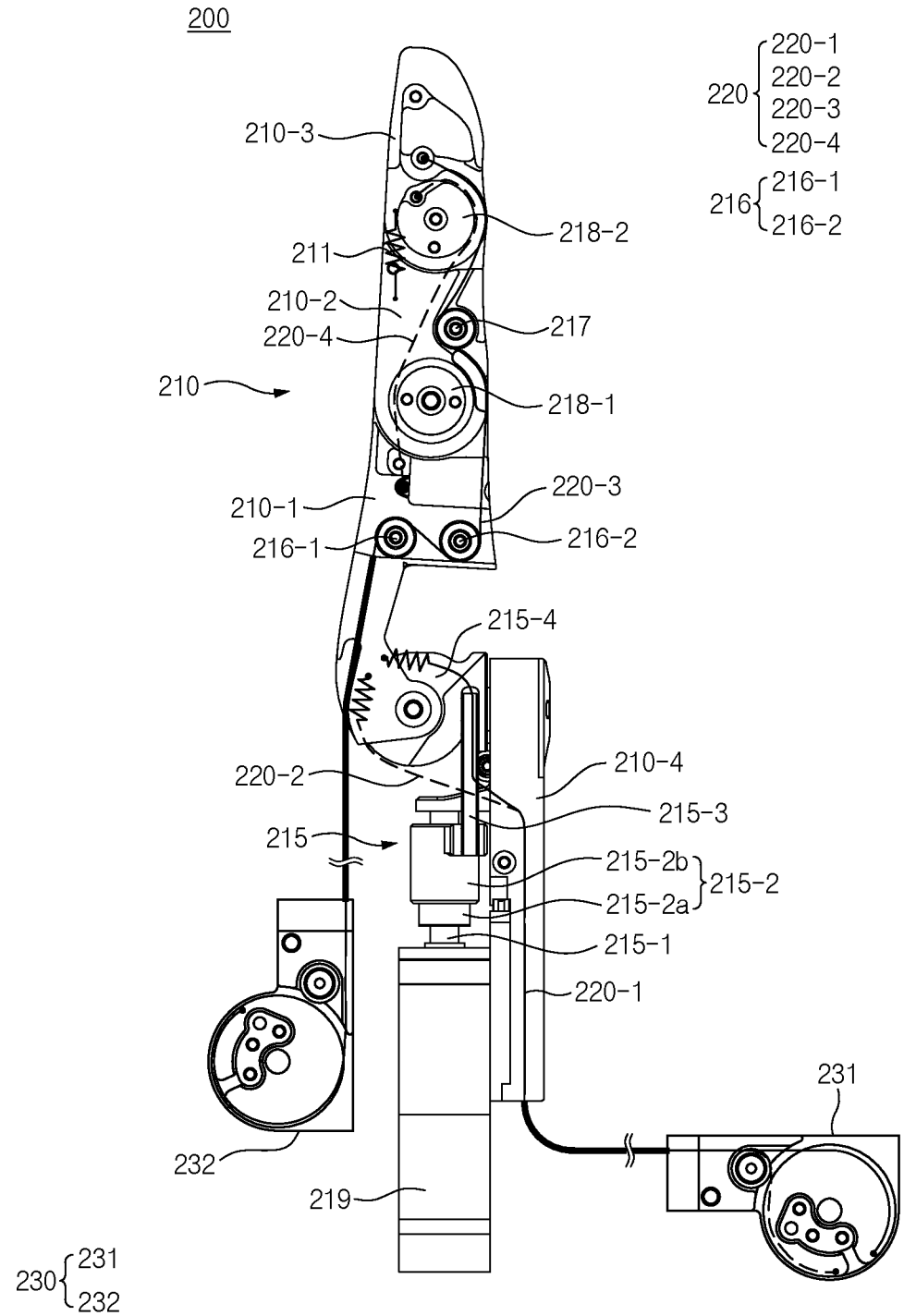
FIG. 8 is a cross-sectional view illustrating a structure of the finger module provided in the robot hand module according to embodiments of the present disclosure.
Figure 9:
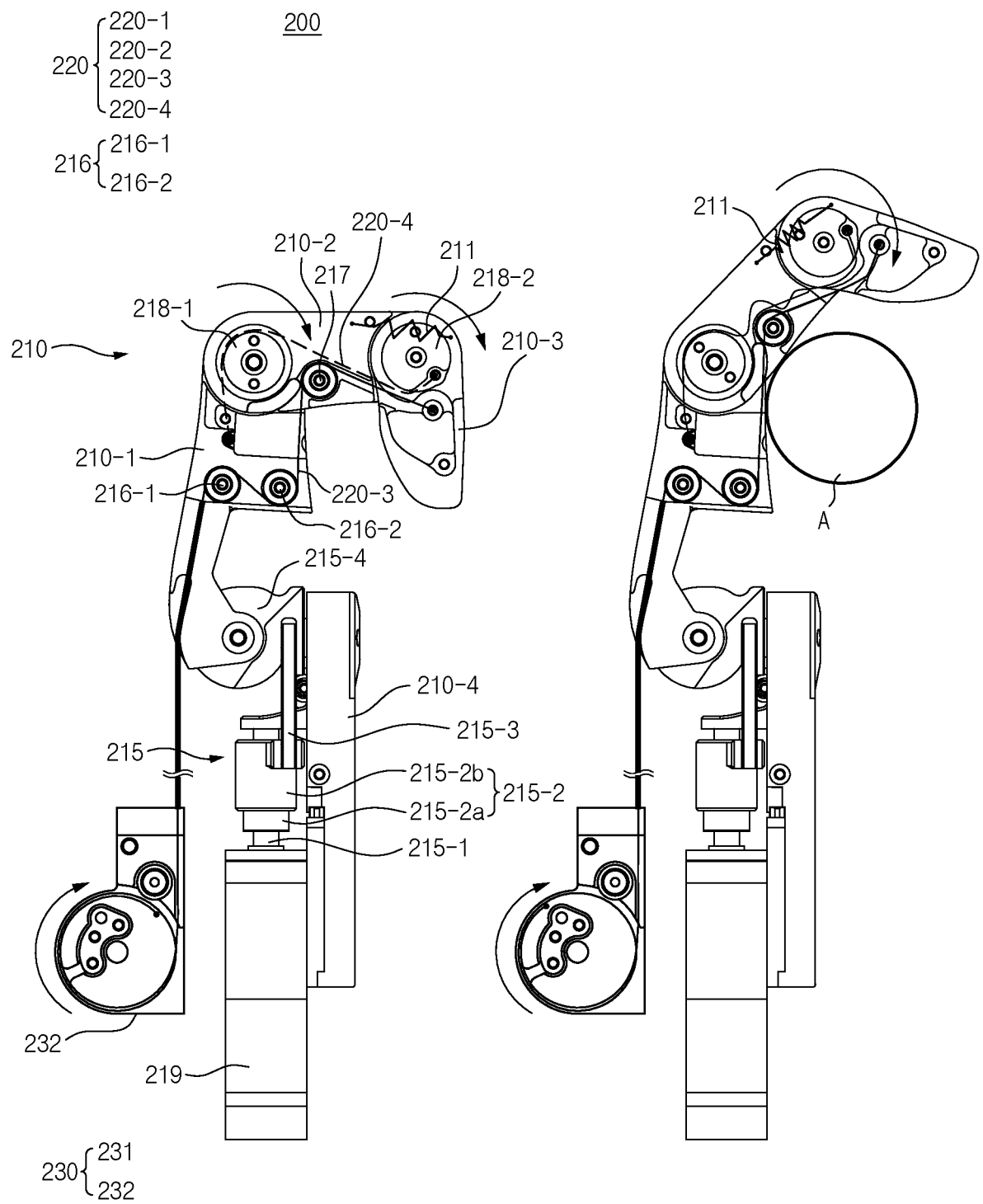
FIG. 9 is a cross-sectional view illustrating a state in which an object is grasped by the finger module provided in the robot hand module according to embodiments of the present disclosure.
Figure 10:
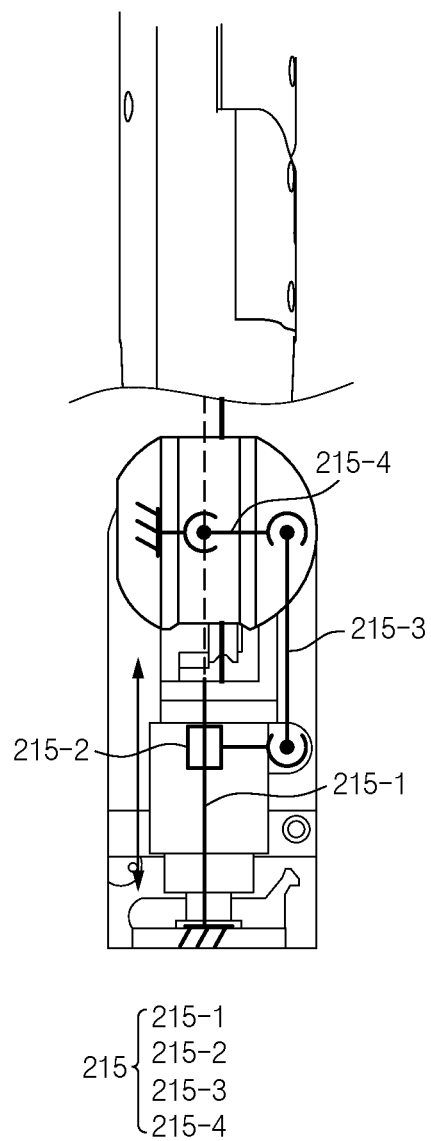
FIG. 10 is a view conceptually illustrating a structure of a finger link part provided in the robot hand module according to embodiments of the present disclosure.
Figure 11:
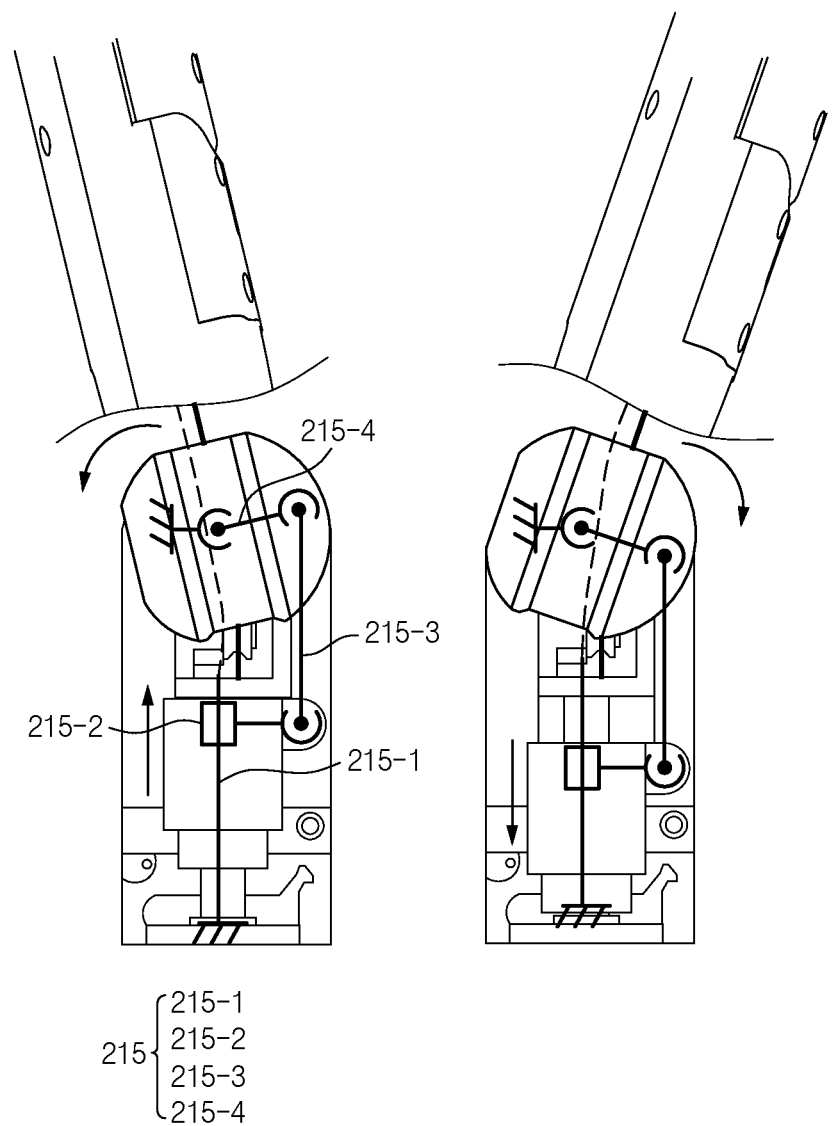
FIG. 11 is a view conceptually illustrating a state in which the finger link part provided in the robot hand module according to embodiments of the present disclosure performs a rotational motion.
Figure 12:
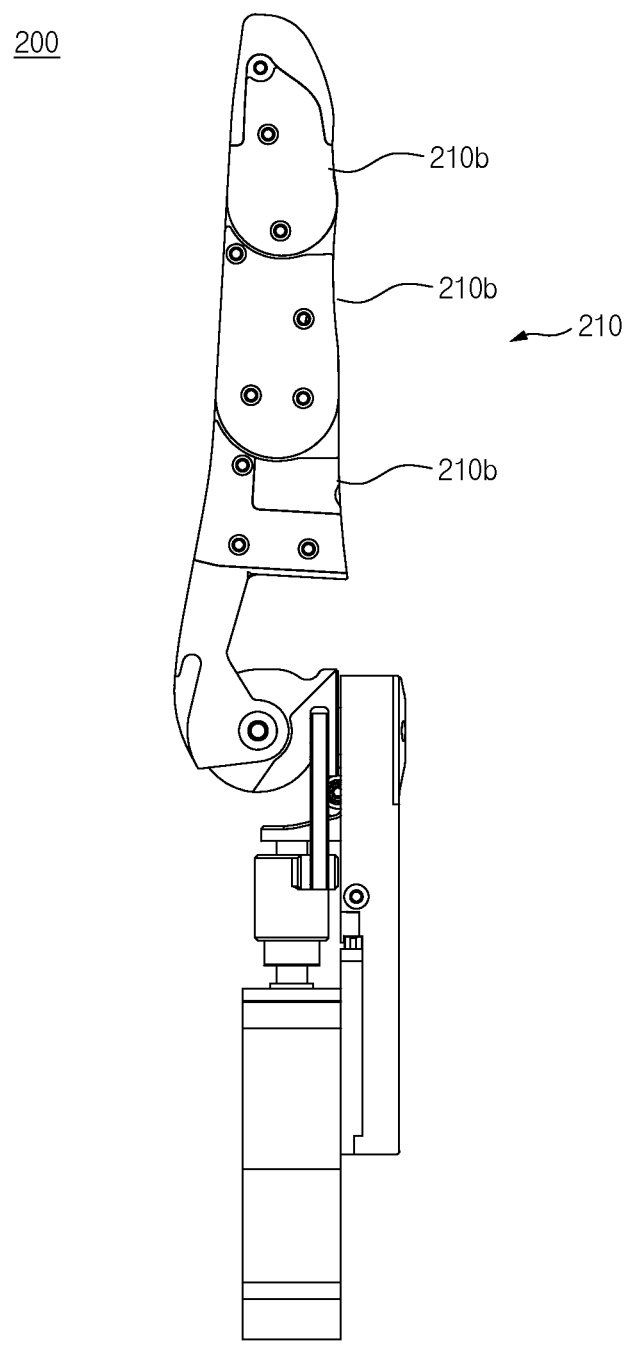
FIG. 12 is a side view illustrating a structure of the finger module provided in the robot hand module according to embodiments of the present disclosure.

FIG. 8 is a cross-sectional view illustrating a structure of the finger module provided in the robot hand module according to embodiments of the present disclosure, and FIG. 9 is a cross-sectional view illustrating a state in which an object is grasped by the finger module provided in the robot hand module according to embodiments of the present disclosure. FIG. 10 is a view conceptually illustrating a structure of a finger link part provided in the robot hand module according to embodiments of the present disclosure, and FIG. 11 is a view conceptually illustrating a state in which the finger link part provided in the robot hand module according to embodiments of the present disclosure performs a rotational motion. In addition, FIG. 12 is a side view illustrating a structure of the finger module provided in the robot hand module according to embodiments of the present disclosure.

Referring to FIGS. 8 to 12, the finger phalangeal part 210 may include finger link parts 215 including a plurality of link members, and a finger link driving part 219 configured to transmit power to the finger link part 215 in a rectilinear direction. According to embodiments of the present disclosure, when the finger link parts 215 receive the power from the finger link driving part 219 in the rectilinear direction, some of the plurality of link members provided in the finger link parts 215 may rectilinearly move, whereas some of the plurality of link members may rotate relative to the other link members, such that the finger phalangeal part 210 may rotate relative to the palm part 300. That is, according to embodiments of the present disclosure, the finger link parts 215 may be configured to implement the rotational motion of the finger module 200 relative to the palm part 300 by converting the rectilinear motion into the rotational motion.

In more detail, the finger link parts 215 may include a first link part 215-1 having one side connected to the finger link driving part 219 and configured to rectilinearly move by receiving the power from the finger link driving part 219, a second link part 215-2 having one side coupled to the first link part 215-1 and configured to be rectilinearly movable, a third link part 215-3 having one side rotatably coupled to the second link part 215-2, and a fourth link part 215-4 having one side rotatably coupled to the third link part 215-3. In this case, according to embodiments of the present disclosure, the finger phalangeal part 210 may be rotated relative to the palm part 300 by the rotational motion of the fourth link part 215-4.

For example, the first link part 215-1 may be a screw member connected to the finger link driving part 219 and configured to perform the rotational motion. Therefore, according to the present disclosure, the first link part 215-1 may rotate by receiving the power from the finger link driving part 219, and thus the first link part 215-1 may rectilinearly move in the upward/downward direction (based on FIGS. 8 and 9).

For example, the second link part 215-2 may include a nut member 215-2a coupled to an upper portion of the screw member, which is the first link part 215-1, and coupled to the screw member by a bolt-nut engagement, and a sliding member 215-2*b* disposed to be in close contact with an upper portion of the nut member 215-2*a* and configured to slide in the upward/downward direction. Therefore, according to embodiments of the present disclosure, when the first link part 215-1, as the screw member, is rotated by the finger link driving part 219, the nut member 215-2*a*, which is coupled to the screw member by the bolt-nut engagement, may move in the upward/downward direction, and the sliding member 215-2*b*, which is in close contact with the nut member 215-2*a*, may also move in the upward/downward direction. For example, the sliding member 215-2*b* may have an approximately cylindrical shape.

For example, the third link part 215-3 may be a rod member rotatably coupled to one side of the sliding member 215-2*b*. Referring to FIGS. 8 to 10, one end portion of the rod member, which is the third link part 215-3, may be hingedly coupled to one side of the sliding member 215-2*b*. Therefore, when the sliding member 215-2*b* moves in the upward/downward direction, the third link part 215-3 may move in the upward/downward direction and also rotate in the state in which one end portion of the third link part 215-3 is coupled to the sliding member 215-2*b*.

For example, the fourth link part 215-4 may include a cylindrical member rotatably coupled to one side of the rod member and configured to be rotatable about a rotation axis.

The fourth link part 215-4 may be connected to finger phalangeal members 210-1, 210-2, and 210-3 to be described below. Therefore, when the fourth link part 215-4 rotates, the finger phalangeal members 210-1, 210-2, and 210-3 may rotate relative to the palm part 300, such that the finger phalangeal members 210-1, 210-2, and 210-3 may rotate relative to the palm part 300 in the direction in which the palm part 300 extends (i.e., the direction parallel to the paper surface in FIGS. 10 and 11). This configuration is different from the following configuration in which the finger phalangeal members rotate so that the finger phalangeal members perform the bending/stretching motions.

Continuing to refer to FIGS. 8 and 9, the finger driving part 230 may include a first finger driving part 231. In addition, the finger cable part 220 may include a first finger cable 220-1 extended from the first finger driving part 231 and having one side in contact with one surface of the fourth link part 215-4 and the other side fixed in the finger phalangeal part 210, and a second finger cable 220-2 extended from the first finger driving part 231 and having one side in contact with the other surface of the fourth link part 215-4 and the other side fixed in the finger phalangeal part 210.

The first finger driving part 231 may be configured to extend or retract the first finger cable 220-1 and the second finger cable 220-2 to rotate the fourth link part 215-4 so that the finger phalangeal members 210-1, 210-2, and 210-3 connected to the fourth link part 215-4 rotate to perform the bending/stretching motion.

In more detail, the second finger cable 220-2 may be retracted when the first finger driving part 231 extends the first finger cable 220-1. The second finger cable 220-2 may be extended when the first finger driving part 231 retracts the first finger cable 220-1.

In particular, as illustrated in FIGS. 8 and 9, the region in which the first finger cable 220-1 is in contact with the fourth link part 215-4 and the region in which the second finger cable 220-2 is in contact with the fourth link part 215-4 may face each other with the fourth link part 215-4 interposed therebetween. Therefore, referring to FIGS. 8 and 9, the first finger driving part 231 may retract the first finger cable 220-1 and extend the second finger cable 220-2 to rotate the fourth link part 215-4 clockwise, and the first finger driving part 231 may extend the first finger cable 220-1 and retract the second finger cable 220-2 to rotate the fourth link part 215-4 counterclockwise.

Meanwhile, as described above, the finger link parts 215 and the finger link driving part 219 may rotate the finger phalangeal members 210-1, 210-2, and 210-3 relative to the palm part 300 in the direction in which the palm part 300 extends.

In this case, as described above, the fourth link part 215-4 may interfere with the first finger cable 220-1 and the second finger cable 220-2 when the rotational motion is performed in the state in which the first finger cable 220-1 and the second finger cable 220-2 are in contact with the fourth link part 215-4. In this case, a loss of power may occur due to friction between the fourth link part 215-4 and the first and second finger cables 220-1 and 220-2, and the first finger cable 220-1 and the second finger cable 220-2 may be damaged.

To prevent the problem, according to embodiments of the present disclosure, the first finger cable 220-1 and the second finger cable 220-2 may slide relative to the fourth link part 215-4. For example, a lubricating material may be applied to a region of the fourth link part 215-4 which is in contact with the first finger cable 220-1 and the second finger cable 220-2.

In more detail, in a region in which the first finger cable 220-1 and the second finger cable 220-2 face the fourth link part 215-4, the first finger cable 220-1 and the second finger cable 220-2 may be positioned in a width of the fourth link part 215-4 at any rotation angle of the fourth link part 215-4. This configuration may mean that the width of the fourth link part 215-4 is sufficiently large so that the first finger cable 220-1 and the second finger cable 220-2 may always be in contact with the fourth link part 215-4. In this case, the first finger cable 220-1 and the second finger cable 220-2 may be prevented from being separated from the fourth link part 215-4 even in a case in which a rotation angle of the fourth link part 215-4 exceeds a predetermined range in accordance with the motion of the finger link part 215. Therefore, it is possible to implement a reversible operation of the robot hand module according to embodiments of the present disclosure.

Meanwhile, as illustrated in FIGS. 8 and 9, the finger phalangeal part 210 may include the first finger phalangeal member 210-1 having one side rotatably coupled to the fourth link part 215-4, the second finger phalangeal member 210-2 having one side rotatably coupled to the first finger phalangeal member 210-1, the third finger phalangeal member 210-3 having one side rotatably coupled to the second finger phalangeal member 210-2, and a finger insertion member 210-4 having one side coupled to the first finger phalangeal member 210-1 and the other side inserted and coupled into the palm part 300. In more detail, the third finger phalangeal member 210-3 of the finger phalangeal part 210 may be disposed farthest from the palm part 300, and the second finger phalangeal member 210-2 and the first finger phalangeal member 210-1 may be disposed in this order in the direction toward the palm part 300.

In this case, referring to FIGS. 8 and 9, a direction in which the third finger phalangeal member 210-3 rotates relative to the second finger phalangeal member 210-2 and a direction in which the second finger phalangeal member 210-2 rotates relative to the first finger phalangeal member 210-1 may be perpendicular to a direction in which the first finger phalangeal member 210-1 rotates relative to the finger insertion member 210-4. In this case, the rotational motion of the first finger phalangeal member 210-1 relative to the finger insertion member 210-4 may be implemented by the finger link parts 215 and the finger link driving part 219. Therefore, the finger insertion member 210-4 may face the finger link parts 215.

Meanwhile, the finger driving part 230 may further include a second finger driving part 232. In addition, the finger cable part 220 may further include a third finger cable 220-3 extended from the second finger driving part 232 and having one side fixed to the third finger phalangeal member 210-3, and a fourth finger cable 220-4 having one end portion fixed in the first finger phalangeal member 210-1 and the other opposite end portion fixed in the third finger phalangeal member 210-3. In more detail, one end portion of the fourth finger cable 220-4 may be fixed in the first finger phalangeal member 210-1, and the other end portion of the fourth finger cable 220-4 may be fixed in the third finger phalangeal member 210-3.

The first finger cable 220-1, the second finger cable 220-2, the third finger cable 220-3, and the fourth finger cable 220-4 are configured to implement the bending/stretching motion of the finger phalangeal part 210 and allow motions of a plurality of phalangeal members provided in the finger phalangeal part 210 to be interlocked to one another. Therefore, the motions of the plurality of phalangeal members may be implemented by a small number of finger driving parts 230, thereby implementing the underactuated mechanism of the finger module 200. In addition, as described below, even though some of the plurality of phalangeal members interfere with an object and stop moving due to the bending/stretching motion of the finger phalangeal part 210 when the finger module 200 grasps the object, the third finger cable 220-3 enables the remaining phalangeal members to continuously perform the bending/stretching motion, thereby allowing the finger module 200 to effectively grasp the object. For example, the third finger cable 220-3 may be configured to enable the finger module 200 to implement a conformal grip.

Continuing to refer to FIGS. 8 and 9, the finger phalangeal part 210 may include first finger pulleys 216 disposed in the first finger phalangeal member 210-1, and a second finger pulley 217 disposed in the second finger phalangeal member 210-2. The first finger pulley 216 and the second finger pulley 217 are configured to be in contact with the third finger cable 220-3. The first finger pulley 216 and the second finger pulley 217 may be configured to support the third finger cable 220-3 so that the third finger cable 220-3 may extend along an optimized route to allow the third finger cable 220-3 to implement the bending/stretching motion of the finger phalangeal part 210. The first finger pulley 216 and the second finger pulley 217 may be configured to move the third finger cable 220-3 in a state in which predetermined tension is applied to the third finger cable 220-3 during the process in which the third finger cable 220-3 is extended or retracted by the second finger driving part 232. The first finger pulley 216 and the second finger pulley 217 may each be provided to be rotatable about a stationary rotary shaft.

In more detail, the first finger pulleys 216 may include a first-1 finger pulley 216-1, and a first-2 finger pulley 216-2 disposed between the first-1 finger pulley 216-1 and the second finger pulley 217 in the direction in which the third finger cable 220-3 extends. In this case, according to embodiments of the present disclosure, the third finger cable 220-3 may be fixed at one side of the third finger phalangeal member 210-3 in a state in which the third finger cable 220-3 is in contact with the first-1 finger pulley 216-1, the first-2 finger pulley 216-2, and the second finger pulley 217. FIGS. 8 and 9 illustrate an example in which the first-1 finger pulley 216-1 is disposed in the left region in the first finger phalangeal member 210-1 and the first-2 finger pulley 216-2 is disposed in the right region in the first finger phalangeal member 210-1.

In more detail, referring to the shape made by cutting the finger phalangeal part 210 in the direction in which the first to third finger phalangeal members 210-1, 210-2, and 210-3 are disposed, the third finger cable 220-3 may be bent clockwise based on the region being in contact with the first-1 finger pulley 216-1 and then extend toward the first-2 finger pulley 216-2, the third finger cable 220-3 may be bent counterclockwise based on the region being in contact with the first-2 finger pulley 216-2 and then extend toward the second finger pulley 217, and the third finger cable 220-3 may be bent clockwise based on the region being in contact with the second finger pulley 217 and then extend toward the third finger phalangeal member 210-3.

Continuing to refer to FIGS. 8 and 9, the finger phalangeal pall 210 may further include a first finger joint region 218-1 which is disposed in a region in which the first finger phalangeal member 210-1 and the second finger phalangeal member 210-2 are coupled to each other and in which the first finger phalangeal member 210-1 and the second finger phalangeal member 210-2 are provided to be rotatable relative to each other, and a second finger joint region 218-2 which is disposed in a region in which the second finger phalangeal member 210-2 and the third finger phalangeal member 210-3 are coupled to each other and in which the second finger phalangeal member 210-2 and the third finger phalangeal member 210-3 are provided to be rotatable relative to each other.

In this case, according to embodiments of the present disclosure, the third finger cable 220-3 may be in contact with the first finger joint region 218-1 or the second finger joint region 218-2. More particularly, the third finger cable 220-3 may be in contact with the first finger joint region 218-1 and the second finger joint region 218-2.

In more detail, referring to the shape made by cutting the finger phalangeal part 210 in the direction in which the first to third finger phalangeal members 210-1, 210-2, and 210-3 are disposed, the third finger cable 220-3 may be bent counterclockwise based on the region being in contact with the first finger joint region 218-1 and then extend toward the second finger pulley 217, and the third finger cable 220-3 may be bent counterclockwise based on the region being in contact with the second finger joint region 218-2 and then extend toward the third finger phalangeal member 210-3.

Meanwhile, as described above, one end portion of the third finger cable 220-3 may be fixed in the finger phalangeal part 210. In more detail, as illustrated in FIGS. 8 and 9, one end portion of the third finger cable 220-3 may be fixed in the third finger phalangeal member 210-3. This is to implement the underactuated mechanism and the conformal grip by allowing the first to third finger phalangeal members 210-1, 210-2, and 210-3 to move together during the process of extending or retracting the third finger cable 220-3.

Meanwhile, like the third finger cable 220-3, the fourth finger cable 220-4 may also be in contact with the first finger joint region 218-1 or the second finger joint region 218-2. More particularly, the fourth finger cable 220-4 may be in contact with the first finger joint region 218-1 and the second finger joint region 218-2.

In more detail, referring to the shape made by cutting the finger phalangeal part 210 in the direction in which the first to third phalangeal members 210-1, 210-2, and 210-3 are disposed, the fourth finger cable 220-4 may be bent clockwise based on the region being in contact with the first finger joint region 218-1 and then extend toward the second finger joint region 218-2, and the fourth finger cable 220-4 may be bent counterclockwise based on the region being in contact with the second finger joint region 218-2 and then fixed in the third finger phalangeal member 210-3. Therefore, as illustrated in FIGS. 8 and 9, the region in contact with the third finger cable 220-3 in the first finger joint region 218-1 and the region in contact with the fourth finger cable 220-4 in the first finger joint region 218-1 may face each other with the first finger joint region 218-1 interposed therebetween. Both the region in contact with the third finger cable 220-3 in the second finger joint region 218-2 and the region in contact with the fourth finger cable 220-4 in the second finger joint region 218-2 may be disposed at one side of the second finger joint region 218-2.

Meanwhile, unlike the third finger cable 220-3, the fourth finger cable 220-4 may be spaced apart from the first finger pulley 216 and the second finger pulley 217. Therefore, the fourth finger cable 220-4 may not be in contact with the first finger pulley 216 and the second finger pulley 217.

In addition, according to embodiments of the present disclosure, the finger phalangeal part 210 may further include a finger elastic member 211 having one end portion fixed in the second finger phalangeal member 210-2 and the other opposite end portion fixed in the third finger phalangeal member 210-3 and configured to provide a rotational restoring force when the third finger phalangeal member 210-3 rotates relative to the second finger phalangeal member 210-2. The finger elastic member 211 may be configured to implement the extension motion that enables the finger phalangeal part 210 to return to a state before the bending/stretching motion by rotating the third finger phalangeal member 210-3 relative to the second finger phalangeal member 210-2 when the bending/stretching motion of the finger phalangeal part 210 is ended. For example, the finger elastic member 211 may be a spring member.

Meanwhile, referring to FIG. 12, according to embodiments of the present disclosure, finger concave regions 210b, which are concavely formed, may be respectively disposed on inner surfaces of the first to third finger phalangeal members 210-1, 210-2, and 210-3 in the direction in which the finger phalangeal part 210 is bent. The finger concave regions 210b may increase a contact area between the finger phalangeal part 210 and an object when the finger phalangeal part 210 grasps the object by performing the bending/stretching motion, thereby allowing the finger phalangeal part 210 to more stably grasp the object.

A method of operating the finger phalangeal part 210 of the robot hand module 10 according to embodiments of the present disclosure will be described below with reference to FIGS. 8 to 12.

As illustrated in FIG. 8, when the second finger driving part 232 operates to retract the third finger cable 220-3 in the state in which the finger phalangeal part 210 is unfolded, the third finger cable 220-3 is retracted to the second finger driving part 232 through a route extending along the second finger joint region 218-2, the second finger pulley 217, the first finger joint region 218-1, the first-2 finger pulley 216-2, and the first-1 finger pulley 216-1. In this case, the length of the third finger cable 220-3 in the finger phalangeal part 210 decreases as the third finger cable 220-3 is retracted. Therefore, the finger phalangeal part 210 performs the bending/stretching motion by means of: (i) the interference between the third finger cable 220-3 and the first finger pulley 216, the second finger pulley 217, the first finger joint region 218-1, and the second finger joint region 218-2; (ii) the rotational motion between the first finger phalangeal member 210-1 and the second finger phalangeal member 210-2 in the first finger joint region 218-1; and (iii) the rotational motion between the second finger phalangeal member 210-2 and the third finger phalangeal member 210-3 in the second finger joint region 218-2. In particular, according to embodiments of the present disclosure, the finger cable part 220 includes not only the first to third finger cables 220-1, 220-2, and 220-3, but also the fourth finger cable 220-4 which has one end portion and the other end portion respectively fixed to the first finger phalangeal member 210-1 and the third finger phalangeal member 210-3 and is bent in the regions in contact with the first finger joint region 218-1 and the second finger joint region 218-2. Therefore, the motions of the first finger joint region 218-1 and the second finger joint region 218-2 may be synchronized during the bending/stretching process of the finger phalangeal part 210. Therefore, the plurality of finger phalangeal members may be moved by the single finger driving part, i.e., the second finger driving part 232, thereby implementing the underactuated mechanism.

Meanwhile, as illustrated in FIG. 9, in order for the finger module 200 to grasp the object A, the finger phalangeal part 210 may perform the bending/stretching motion so that all of the first finger phalangeal member 210-1, the second finger phalangeal member 210-2, and the third finger phalangeal member 210-3 press the object A. Therefore, even though the first finger phalangeal member 210-1 and the second finger phalangeal member 210-2 press the object A first and thus the first finger phalangeal member 210-1 and the second finger phalangeal member 210-2 are stopped during the bending/stretching process of the finger phalangeal part 210, the third finger phalangeal member 210-3 needs to continuously rotate relative to the second finger phalangeal member 210-2.

In this case, according to embodiments of the present disclosure described above, since the end portion of the third finger cable 220-3 is fixed in the third finger phalangeal member 210-3, the third finger phalangeal member 210-3 may consistently rotate until the third finger phalangeal member 210-3 presses the object A even though the first finger phalangeal member 210-1 and the second finger phalangeal member 210-2 are stopped. Therefore, according to embodiments of the present disclosure, the finger phalangeal part 210 may effectively grasp the object A by means of the conformal grip.

Meanwhile, referring back to FIGS. 5 and 6, the thumb phalangeal part 110 may include a thumb pre-tensioner 112 configured to pull one side of the thumb cable part 120. FIGS. 5 and 6 illustrate an example in which the thumb pre-tensioner 112 pulls one side of the first thumb cable 120-1.

The tension applied to the first thumb cable 120-1 may be changed during the process of operating the thumb module 100. In particular, in the case of the first thumb cable 120-1, the tension is greatly changed during the bending/stretching motion of the thumb phalangeal part 110. In a case in which the tension applied to the first thumb cable 120-1 is too low or a case in which the tension is not applied but a compressive force is applied, the bending/stretching motion intended to be implemented by the thumb module 100 is not appropriately implemented or the first thumb cable 120-1 may deviate from an original position. For example, in a case in which a force is forcibly applied from the outside and the thumb phalangeal part 110 provided in the thumb module 100 performs the bending/stretching motion or in a case in which a force is forcibly applied from the outside, while the thumb phalangeal part 110 is unfolded again after the bending/stretching motion, and thus the thumb phalangeal part 110 stops moving, the tension applied to the first thumb cable 120-1 decreases or disappears until the thumb driving part 130 separately operates to retract the first thumb cable 120-1. In this process, the first thumb cable 120-1 may deviate from the original position, which may cause a breakdown of the thumb module 100.

The thumb pre-tensioner 112 may always apply the tension to the first thumb cable 120-1 regardless of the force applied from the outside, thereby preventing the deviation of the first thumb cable 120-1 from the original position and preventing a breakdown of the thumb module 100.

To this end, one side of the thumb pre-tensioner 112 may be disposed in the thumb phalangeal part 110 and fixed relative to the thumb phalangeal part 110, and the other side of the thumb pre-tensioner 112 may be fixed to the thumb cable part 120, particularly, to the first thumb cable 120-1. Therefore, when the tension applied to the first thumb cable 120-1 decreases, the other side of the thumb pre-tensioner 112 may move toward one side of the thumb pre-tensioner 112. When the tension applied to the first thumb cable 120-1 increases, the other side of the thumb pre-tensioner 112 may move away from one side of the thumb pre-tensioner 112.

Continuing to refer to FIGS. 5 and 6, the thumb pre-tensioner 112 may include a spring member 112-1 having one end portion fixed to the thumb phalangeal part 110, and a catching member 112-2 coupled to the other end portion of the spring member 112-1 and configured to be in contact with a part of the first thumb cable 120-1. The first thumb cable 120-1 may be in contact with a region of the catching member 112-2 that faces the other end portion of the spring member 112-1. Therefore, according to embodiments of the present disclosure, as the catching member 112-2 is moved by the interference between the catching member 112-2 and the first thumb cable 120-1, the first thumb cable 120-1 may also move in the region in contact with the catching member 112-2. Meanwhile, as illustrated in FIGS. 5 and 6, at least a part of a trajectory along which the catching member 112-2 may move may be positioned in a region between the first-1 thumb pulley 116-1 and the first-2 thumb pulley 116-2.

More particularly, as illustrated in FIGS. 5 and 6, a space portion 110a, in which the catching member 112-2 is movably disposed, may be defined in the thumb phalangeal part 110 and extend in a longitudinal direction thereof, i.e., a direction in which the spring member 112-1 extends. In this case, the spring member 112-1 may also be disposed in the space portion 110a. Therefore, when the tension applied to the first thumb cable 120-1 is changed, the catching member 112-2 may move in the space portion 110a until the equilibrium is established between the elastic force of the spring member 112-1 and the tension applied to the first thumb cable 120-1. FIGS. 5 and 6 illustrate an example in which the space portion 110a extends in a longitudinal direction thereof, i.e., a direction oblique with respect to the direction in which the thumb phalangeal part 110 extends. Meanwhile, as illustrated in FIGS. 5 and 6, at least a part of the space portion 110a may be positioned in a region between the first-1 thumb pulley 116-1 and the first-2 thumb pulley 116-2. Therefore, the catching member 112-2 may move away from the first-1 thumb pulley 116-1 and the first-2 thumb pulley 116-2 or move toward the first-1 thumb pulley 116-1 and the first-2 thumb pulley 116-2.

Meanwhile, as described above, the thumb phalangeal part 110 may include the first thumb phalangeal member 110-1, the second thumb phalangeal member 110-2, the third thumb phalangeal member 110-3, the fourth thumb phalangeal member 110-4, and the thumb insertion member 110-5. In this case, the thumb pre-tensioner 112 may be disposed in the second thumb phalangeal member 110-2. However, the thumb pre-tensioner 112 may be positioned in any one of the other thumb phalangeal members.

An operational principle of the thumb pre-tensioner 112 according to embodiments of the present disclosure will be described below.

When the tension applied to the first thumb cable 120-1 increases as the thumb driving part 130 retracts the first thumb cable 120-1 to perform the extension motion for unfolding the thumb phalangeal part 110, the catching member 112-2, which interferes with the first thumb cable 120-1 with the contact with the first thumb cable 120-1, moves in the direction in which the tension applied to the first thumb cable 120-1 decreases and the elastic force applied to the spring member 112-1 increases. That is, the catching member 112-2 moves to be close to the first-1 thumb pulley 116-1 and the first-2 thumb pulley 116-2. When the equilibrium is established between the forces applied to the catching member 112-2 by the tension applied to the first thumb cable 120-1 and the elastic force applied to the spring member 112-1, the catching member 112-2 is stopped.

On the contrary, the tension applied to the first thumb cable 120-1 decreases when an external force is applied to the thumb phalangeal part 110 and forces the thumb phalangeal part 110 to perform the bending/stretching motion or when the extension motion is stopped by an external force while the thumb phalangeal part 110 performs the extension motion. Therefore, the catching member 112-2 moves in the direction in which the tension applied to the first thumb cable 120-1 increases and the elastic force applied to the spring member 112-1 decreases. That is, the catching member 112-2 moves to be distant from the first-1 thumb pulley 116-1 and the first-2 thumb pulley 116-2. When the equilibrium is established between the forces applied to the catching member 112-2 by the tension applied to the first thumb cable 120-1 and the elastic force applied to the spring member 112-1, the catching member 112-2 is stopped.

Figure 13:
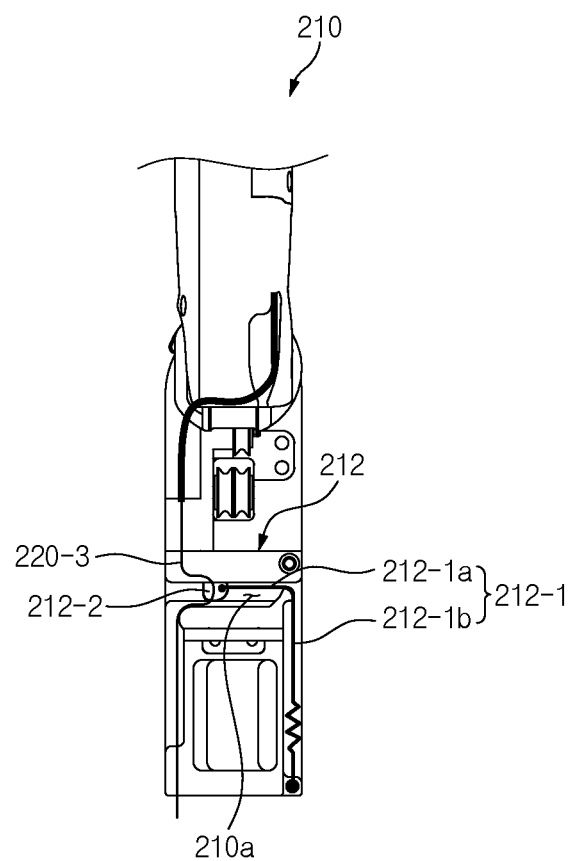
FIGS. 13 and 14 are cross-sectional views illustrating a structure of a finger pre-tensioner provided in the robot hand module according to embodiments of the present disclosure.
Figure 14:
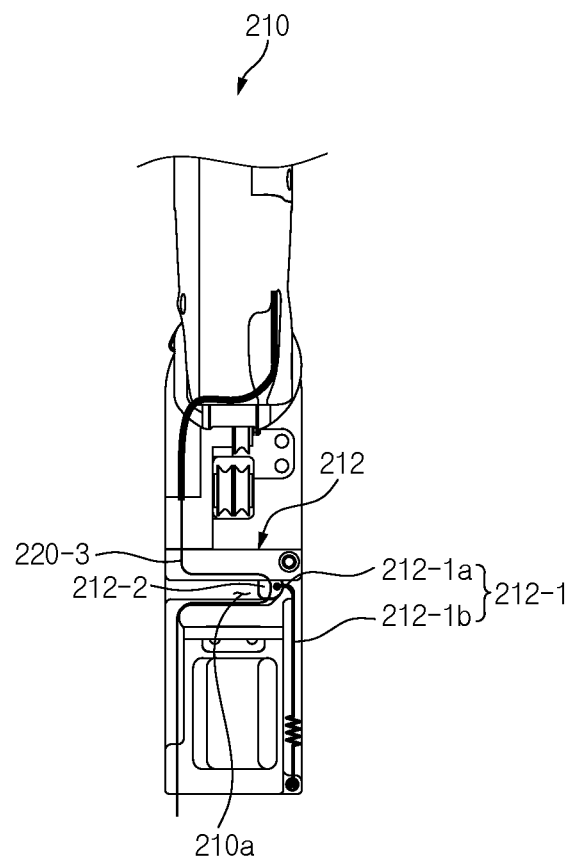

FIGS. 13 and 14 are cross-sectional views illustrating a structure of a finger pre-tensioner provided in the robot hand module according to embodiments of the present disclosure.

Like the thumb phalangeal part 110, the finger phalangeal pall 210 may also include a finger pre-tensioner 212 configured to pull one side of the finger cable pall 220. FIGS. 13 and 14 illustrate an example in which the finger pre-tensioner 212 pulls one side of the third finger cable 220-3.

The tension applied to the third finger cable 220-3 may be changed during the process of operating the finger module 200. In particular, in the case of the third finger cable 220-3 of the finger cable part, the tension is greatly changed during the bending/stretching motion of the finger phalangeal part 210. In a case in which the tension applied to the third finger cable 220-3 is too low or a case in which the tension is not applied but a compressive force is applied, the bending/stretching motion intended to be implemented by the finger module 200 is not appropriately implemented or the third finger cable 220-3 may deviate from an original position. For example, in a case in which a force is applied from the outside and the finger phalangeal part 210 provided in the finger module 200 performs the bending/stretching motion or in a case in which a force is forcibly applied from the outside, while the finger phalangeal part 210 is unfolded again after the bending/stretching motion, and thus the finger phalangeal part 210 stops moving, the tension applied to the third finger cable 220-3 decreases or disappears until the finger driving part 230 separately operates to retract the third finger cable 220-3. In this process, the third finger cable 220-3 may deviate from the original position, which may cause a breakdown of the finger module 200.

The finger pre-tensioner 212 may always apply the tension to the third finger cable 220-3 regardless of the force applied from the outside, thereby preventing the deviation of the third finger cable 220-3 from the original position and preventing a breakdown of the finger module 200.

To this end, one side of the finger pre-tensioner 212 may be disposed in the finger phalangeal part 210 and fixed relative to the finger phalangeal part 210, and the other side of the finger pre-tensioner 212 may be fixed to the finger cable part 220, particularly, to the third finger cable 220-3. Therefore, when the tension applied to the third finger cable 220-3 decreases, the other side of the finger pre-tensioner 212 may move toward one side of the finger pre-tensioner 212. When the tension applied to the third finger cable 220-3 increases, the other side of the finger pre-tensioner 212 may move away from one side of the finger pre-tensioner 212.

Continuing to refer to FIGS. 13 and 14, the finger pre-tensioner 212 may include a spring member 212-1 having one end portion fixed to the finger phalangeal part 210, and a catching member 212-2 coupled to the other end portion of the spring member 212-1 and configured to be in contact with a part of the third finger cable 220-3. The third finger cable 220-3 may be in contact with a region of the catching member 212-2 that faces the other end portion of the spring member 212-1. Therefore, according to embodiments of the present disclosure, as the catching member 212-2 is moved by the interference between the catching member 212-2 and the third finger cable 220-3, the third finger cable 22-3 may also move in the region in contact with the catching member 212-2.

Meanwhile, more particularly, as illustrated in FIGS. 13 and 14, a space portion 210a, in which the catching member 212-2 is movably disposed, may be defined in the finger phalangeal part 210 and extend in a longitudinal direction thereof, i.e., a direction in which the spring member 212-1 extends. In this case, the spring member 212-1 may also be disposed in the space portion 210a. Therefore, when the tension applied to the third finger cable 220-3 is changed, the catching member 212-2 may move in the space portion 110a until the equilibrium is established between the elastic force of the spring member 212-1 and the tension applied to the third finger cable 220-3. FIGS. 13 and 14 illustrate an example in which the space portion 210a extends in a longitudinal direction thereof, i.e., a direction perpendicular to the direction in which the finger phalangeal part 210 extends.

Meanwhile, the spring member 212-1 may have a bent structure. In more detail, the spring member 212-1 may include a first region 212-1a disposed in the space portion 210a and having one end portion fixed to the catching member 212-2, and a second region 212-1b bent at a predetermined angle with respect to the first region 212-1a and having one end portion fixed relative to the finger phalangeal part 210. In this case, in the space portion 210a, a width of a section in which the first region 212-1a and the second region 212-1b meet together may be smaller than a width of another section. This configuration may prevent the catching member 212-2 from moving to one end portion of the second region 212-1b.

Meanwhile, as described above, the finger phalangeal part 210 may include the first finger phalangeal member 210-1, the second finger phalangeal member 210-2, the third finger phalangeal member 210-3, and the finger insertion member 210-4. In this case, the finger pre-tensioner 212 may be disposed in the finger insertion member 210-4.

An operational principle of the finger pre-tensioner 212 according to embodiments of the present disclosure will be described below.

When the tension applied to the third finger cable 220-3 increases as the second finger driving part 232 retracts the third finger cable 220-3 to perform the extension motion for unfolding the finger phalangeal part 210, the catching member 212-2, which interferes with the third finger cable 220-3 with the contact with the third finger cable 220-3, moves in the direction in which the tension applied to the third finger cable 220-3 decreases and the elastic force applied to the spring member 212-1 increases. That is, the catching member 212-2 moves to the left based on FIGS. 13 and 14. When the equilibrium is established between the forces applied to the catching member 212-2 by the tension applied to the third finger cable 220-3 and the elastic force applied to the spring member 212-1, the catching member 212-2 is stopped.

On the contrary, the tension applied to the third finger cable 220-3 decreases when an external force is applied to the finger phalangeal part 210 and forces the finger phalangeal part 210 to perform the bending/stretching motion or when the extension motion is stopped by an external force while the finger phalangeal part 210 performs the extension motion. Therefore, the catching member 212-2 moves in the direction in which the tension applied to the third finger cable 220-3 increases and the elastic force applied to the spring member 212-1 decreases. That is, the catching member 212-2 moves to the right based on FIGS. 13 and 14. When the equilibrium is established between the forces applied to the catching member 212-2 by the tension applied to the third finger cable 220-3 and the elastic force applied to the spring member 212-1, the catching member 212-2 is stopped.

Figure 15:
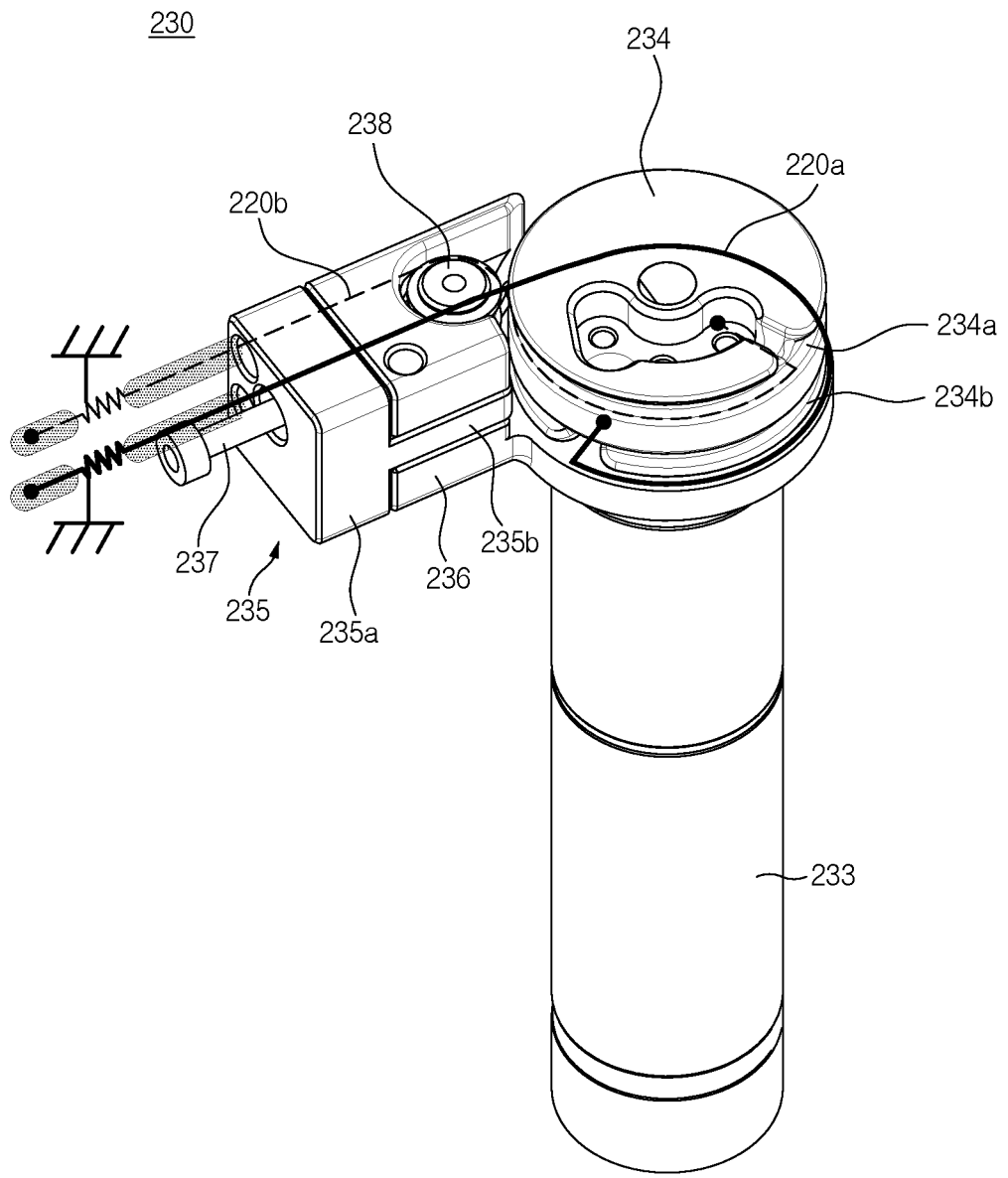
FIGS. 15 and 16 are perspective views illustrating detailed structures of the thumb driving part and the finger driving part provided in the robot hand module according to embodiments of the present disclosure.
Figure 16:
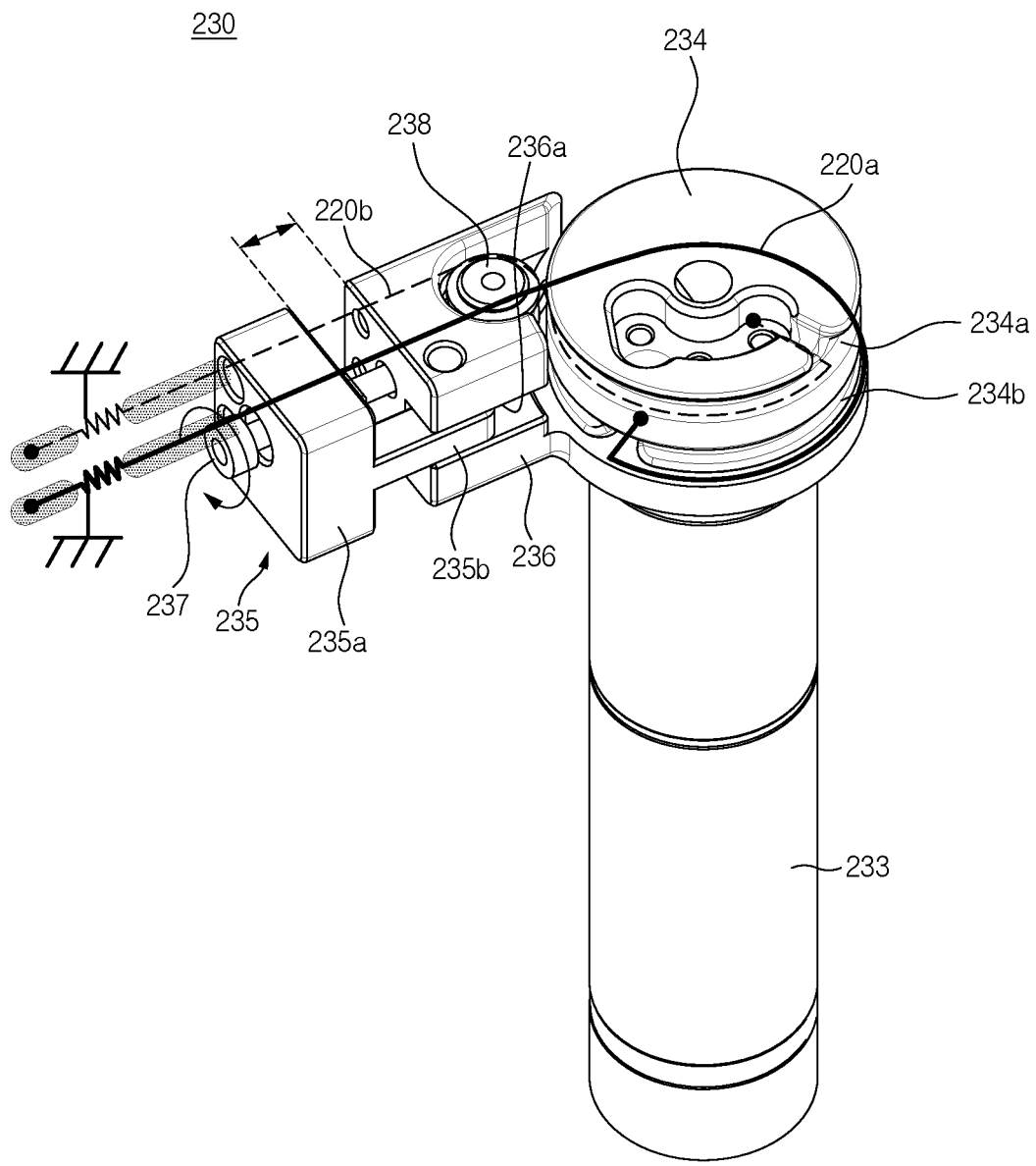
Figure 17:
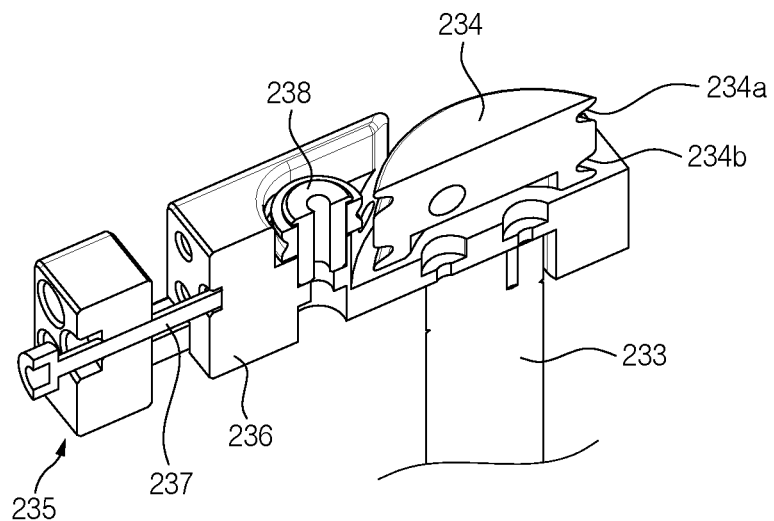
FIG. 17 is a cross-sectional view illustrating detailed structures of the thumb driving part and the finger driving part provided in the robot hand module according to embodiments of the present disclosure.

FIGS. 15 and 16 are perspective views illustrating detailed structures of the thumb driving part and the finger driving part provided in the robot hand module according to embodiments of the present disclosure, and FIG. 17 is a cross-sectional view illustrating detailed structures of the thumb driving part and the finger driving part provided in the robot hand module according to embodiments of the present disclosure.

Meanwhile, reference numerals are illustrated in FIGS. 15 to 17 on the basis of the structure of the finger driving part 230. However, the following description of the structure of the driving part may be equally applied to both the thumb driving part 130 and the finger driving part 230.

Referring to FIGS. 15 to 17, the driving part 230 may include a driving part body 233 extending in one direction and including a rotary shaft configured to rotate by receiving power, a drum member 234 coupled to one side of the driving part body 233, connected to the rotary shaft, and having an outer periphery surrounded by portions of the first and second cables 220a and 220b, and a tensioner member 235 spaced apart from the drum member 234 in a direction in which the first and second cables 220a and 220b extend outward.

The tensioner member 235 may be configured to adjust tension of the portions of the first and second cables 220a and 220b coupled to the driving part 230. That is, the tension of the cables provided in the robot hand module 10 according to embodiments of the present disclosure may be adjusted by the tensioner member 235 provided in the driving part 230 as well as the thumb pre-tensioner 112 and the finger pre-tensioner 212. In more detail, according to embodiments of the present disclosure, the tension of the cable part may be adjusted by the driving part 230 before the robot hand module 10 operates properly, and the tension of the cable part may be adjusted by the thumb pre-tensioner 112 and the finger pre-tensioner 212 during the process of operating the robot hand module 10. FIGS. 15 and 16 illustrate that the cable part includes a first cable 220a extended from the driving part 230, and a second cable 220b extended from the driving part 230 and provided separately from the first cable 220a. For example, the first cable 220a and the second cable 220b may be the first finger cable 220-1 (see FIG. 8) and the second finger cable 220-2 (see FIG. 8), respectively.

According to embodiments of the present disclosure, the tensioner member 235 may be movable in the direction in which the first and second cables 220a and 220b extend, and the tension of the first and second cables 220a and 220b may be adjusted by the movement of the tensioner member 235.

In more detail, the driving part 230 may further include a base member 236 disposed between the drum member 234 and the tensioner member 235 and fixed to the drum member 234, and a rod member 237 configured to penetrate the base member 236 and having one end portion inserted into the tensioner member 235. In this case, when the rod member 237 rotates, the tensioner member 235 is interlocked with the motion of the rod member 237 and thus moves away from the base member 236 or moves toward the base member 236. For example, the rod member 237 and the tensioner member 235 may be coupled to each other by a bolt-nut engagement. One end portion of the rod member 237 may be in close contact with the base member 236 in a state in which one end portion of the rod member 237 is inserted into a groove region concavely recessed in the base member 236. Therefore, when the rod member 237 rotates, the rod member 237 does not move in a forward/rearward direction, but the tensioner member 235, which is coupled to the rod member 237 by the bolt-nut engagement, may move in the forward/rearward direction.

Continuing to refer to FIGS. 15 to 17, the drum member 234 may include grooves 234a and 234b formed in an outer surface of the drum member 234 and recessed in the outer surface of the drum member 234, and the first and second cables 220a and 220b may be respectively inserted into the grooves 234a and 234b.

In more detail, the grooves 234a and 234b may include a first groove 234a formed in the outer surface of the drum member 234 and configured to allow the first cable 220a to be inserted thereinto, and a second groove 234b formed in the outer surface of the drum member 234 and configured to allow the second cable 220b to be inserted thereinto. According to embodiments of the present disclosure, when the drum member 234 is rotated in one direction by the rotation of the driving part body 233, the first cable 220a and the second cable 220b may be extended from the drum member 234. When the drum member 234 rotates in the reverse direction, the first cable 220a and the second cable 220b may be retracted to the drum member 234.

Continuing to refer to FIGS. 15 to 17, the tensioner member 235 may include a tensioner body region 235a configured to define a body of the tensioner member 235, and a protruding region 235b protruding from the tensioner body region 235a toward the base member 236. The base member 236 may include a guide region 236a having a shape corresponding to the protruding region 235b and configured to provide a space into which the protruding region 235b is inserted. According to embodiments of the present disclosure, the tensioner member 235 may be repeatedly moved along a predetermined route in the forward/rearward direction by the interference between the protruding region 235b and the guide region 236a.

Meanwhile, the driving part 230 may further include a driving pulley 238 disposed at one side of the drum member 234. In this case, the second cable 220b may be in contact with an outer surface of the driving pulley 238, bent in the region in contact with the driving pulley 238, and extend toward the tensioner member 235. In contrast, the first cable 220a may be spaced apart from the driving pulley 238.

The driving pulley 238 may be configured to allow the first cable 220a and the second cable 220b to move in opposite directions. That is, as described above, the directions in which the first finger cable and the second finger cable are extended or retracted need to be opposite to each other to implement the bending/stretching motion and the extension motion of the finger phalangeal part 210 using the first finger cable 220-1 (see FIG. 8) and the second finger cable 220-2 (see FIG. 8).

According to embodiments of the present disclosure, the second cable 220b surrounds the driving pulley 238, is bent in the region in contact with the driving pulley 238, and extends toward the tensioner member 235. Therefore, when the drum member 234 rotates in one direction, the first cable 220a may be retracted, and the second cable 220b may be extended. In contrast, when the drum member 234 rotates in the reverse direction, the first cable 220a may be extended, and the second cable 220b may be retracted. Therefore, according to embodiments of the present disclosure, a direction in which the first cable 220a surrounds the first groove 234a of the drum member 234 and then extends toward the tensioner member 235 may be opposite to a direction in which the second cable 220b surrounds the second groove 234b of the drum member 234 and then extends toward the tensioner member 235.

Figure 18:
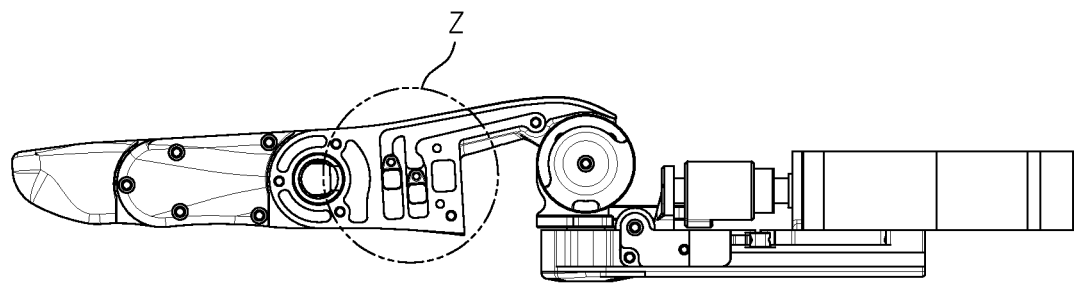
FIG. 18 is a view illustrating components for adjusting tension of wires provided in a finger phalangeal part provided in the robot hand module according to embodiments of the present disclosure.
Figure 19:
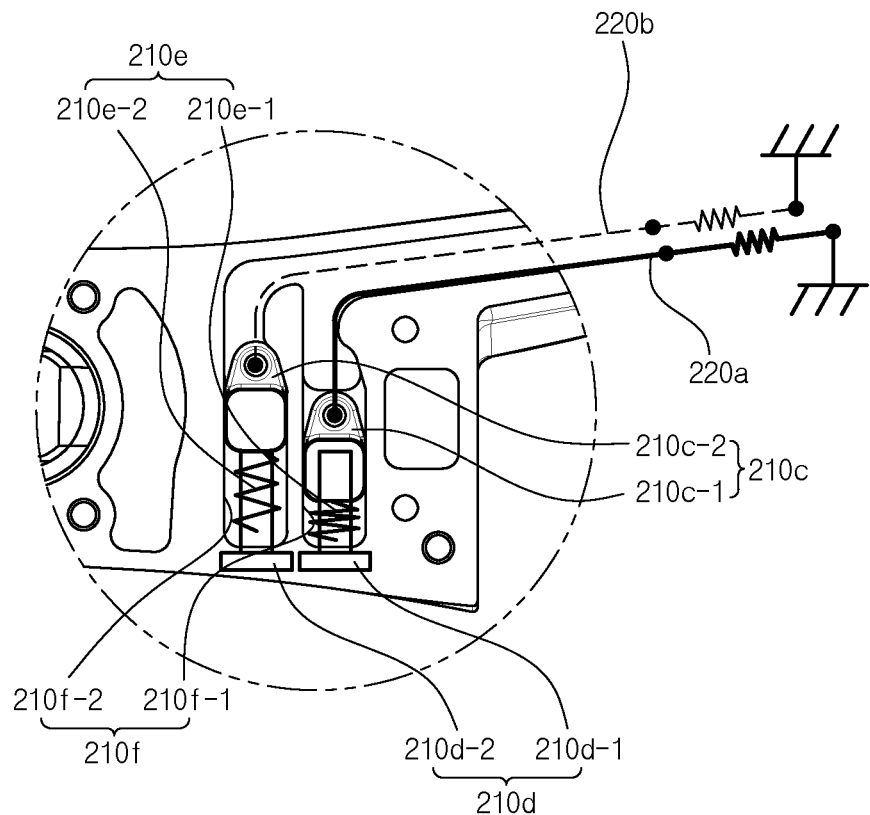
FIG. 19 is an enlarged cross-sectional view of part Z in FIG. 18.

FIG. 18 is a view illustrating components for adjusting tension of wires provided in the finger phalangeal part provided in the robot hand module according to embodiments of the present disclosure, and FIG. 19 is an enlarged cross-sectional view of part Z in FIG. 18.

Meanwhile, reference numerals are illustrated in FIGS. 18 and 19 on the basis of the structure of the finger phalangeal part 210. However, the following description of the structure of the phalangeal part may be equally applied to both the thumb phalangeal part 110 and the finger phalangeal part 210.

Referring to FIGS. 18 and 19, the phalangeal part 210 may include holder members 210c disposed in the phalangeal part 210 and respectively fixed to one end portion of the first cable 220a and one end portion of the second cable 220b, rod members 210d each having one end portion inserted into each of the holder members 210c, and elastic members 210e disposed between the holder members 210c and the rod members 210d and configured to press the holder members 210c and the rod members 210d. In this case, according to embodiments of the present disclosure, the tension of the first and second cables 220a and 220b may be adjusted by the movements of the holder members 210c. Meanwhile, for example, the first and second cables 220a and 220b may be the first finger cable 220-1 (see FIG. 8) and the second finger cable 220-2 (see FIG. 8), respectively.

In more detail, the rod member 210d and the holder member 210c may be coupled to each other by a bolt-nut engagement, and the rod member 210d may be in close contact with an inner surface of the phalangeal part 210. Therefore, when the rod members 210d rotate, positions of the holder members 210c relative to the rod members 210d are adjusted in the state in which the rod members 210*d* are fixed to the inner surface of the phalangeal part 210, such that the tension of the first and second cables 220*a* and 220*b* may be adjusted. When the rod member 210*d* rotates, the holder member 210*c* may move in the upward/downward direction based on FIG. 19. Meanwhile, since the tension of the first and second cables 220*a* and 220*b* is adjusted by adjusting the relative positions between the rod members 210*d* and the holder members 210*c*, the elastic members 210*e* may not be configured to directly adjust the tension of the first and second cables 220*a* and 220*b*. However, when tension is not applied to the first cable 220*a* and the second cable 220*b* but a compressive force is applied to the first cable 220*a* and the second cable 220*b*, the elastic members 210*e* may press the holder members 210*c* toward the inside of the phalangeal part 210 to prevent the holder members 210*c* and the rod members 210*d* from protruding to the outside.

Continuing to refer to FIGS. 18 and 19, the phalangeal part 210 may further include guide regions 210*f* that provide spaces into which the holder members 210*c* are inserted and spaces in which the holder members 210*c* are moved by the rotation of the rod members 210*d*. A width of the guide region 210*f* may correspond to a width of the holder member 210*c* so that a movement route of the holder member 210*c* is constantly formed.

Meanwhile, the holder member 210*c*, the rod member 210*d*, the elastic member 210*e*, and the guide region 210*f* may each be provided in plural.

In more detail, the holder members 210*c* may include a first holder member 210*c*-1 fixed to one end portion of the first cable 220*a*, and a second holder member 210*c*-2 fixed to one end portion of the second cable 220*b*. The rod members 210*d* may include a first rod member 210*d*-1 having one end portion inserted into the first holder member 210*c*-1, and a second rod member 210*d*-2 having one end portion inserted into the second holder member 210*c*-2. The elastic members 210*e* may include a first elastic member 210*e*-1 disposed between the first holder member 210*c*-1 and the first rod member 210*d*-1, and a second elastic member 210*e*-2 disposed between the second holder member 210*c*-2 and the second rod member 210*d*-2. In addition, the guide regions 210*f* may include a first guide region 210*f*-1 configured to provide a space into which the first holder member 210*c*-1 is inserted, and a second guide region 210*f*-2 configured to provide a space into which the second holder member 210*c*-2 is inserted.

Figure 20:
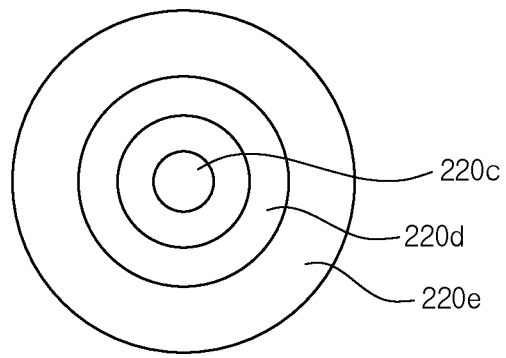
FIG. 20 is a cross-sectional view illustrating a cross-sectional structure of a cable provided in the robot hand module according to embodiments of the present disclosure.

FIG. 20 is a cross-sectional view illustrating a cross-sectional structure of the cable provided in the robot hand module according to embodiments of the present disclosure. Meanwhile, the following description of the cable part may be equally applied to the first and second thumb cables 120-1 and 120-2, the first to fourth finger cables 220-1, 220-2, 220-3, and 220-4, and the first and second cables 220*a* and 220*b*.

According to embodiments of the present disclosure, the cable part 220 may have a layered structure. In more detail, the cable part 220 may include a wire region 220*c* disposed in a central region of the cable part 220, a first sheath region 220*d* configured to surround an outer portion of the wire region 220*c* and spaced apart from the wire region 220*c*, and a second sheath region 220*e* configured to surround an outer portion of the first sheath region 220*d*. A portion between the wire region 220*c* and the first sheath region 220*d* may be filled with a lubricating material.

Meanwhile, the first sheath region 220*d* and the second sheath region 220*e* may be disposed in a region of the cable part 220 which is exposed to the outside. The first sheath region 220*d* and the second sheath region 220*e* may not be disposed but only the wire region 220*c* may be disposed in a region of the cable part 220 which is disposed in the phalangeal part 210 or the driving part 230. The first and second sheath regions 220*d* and 220*e* may be configured to protect the wire region 220*c*. The bending/stretching motion and the extension motion of the thumb module and the finger module may be implemented by the wire region 220*c*.

Meanwhile, for example, referring to FIGS. 15 to 17, the cable part 220 may be inserted and fitted into the tensioner body region 235*a* of the tensioner member 235. Therefore, the first and second sheath regions 220*d* and 220*e* of the cable part 220 may be fixed to the tensioner body region 235*a*.

As illustrated in FIG. 16, when the rod member 237 rotates and the tensioner member 235 moves away from the base member 236 in this state, the first and second sheath regions 220*d* and 220*e* are compressed. Therefore, the first and second sheath regions 220*d* and 220*e* apply forces forward to components (e.g., the phalangeal part and the like) disposed in front of the first and second sheath regions 220*d* and 220*e*, such that the components disposed in front of the first and second sheath regions 220*d* and 220*e* are finely compressed. Meanwhile, since the wire region 220*c* is connected to the components (e.g., the phalangeal part) disposed in front of the first and second sheath regions 220*d* and 220*e*, the tension applied to the wire region 220*c* increases to the extent that the components disposed in front of the first and second sheath regions 220*d* and 220*e* are compressed. Therefore, the driving part 230 may increase the tension of the cable part 220, i.e., the wire region 220*c*. The tension of the wire region 220*c* may be decreased by decreasing an interval between the tensioner member 235 and the base member 236.

The present disclosure has been described with reference to the exemplary embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A robot hand module comprising:
a palm part; and
a thumb module coupled to the palm part,
wherein:
   the thumb module comprises:
      a thumb phalangeal part movably coupled to the palm part;
      a thumb cable part having a first side connected to the thumb phalangeal part; and
      a thumb driving part connected to a second side of the thumb cable part and configured to operate the thumb phalangeal part by extending the thumb cable part to an outside or retracting the thumb cable part,
   the thumb phalangeal part comprises:
      a thumb pre-tensioner configured to pull the thumb cable part;
      a first side of the thumb pre-tensioner being fixed relative to the thumb phalangeal part; and
      a second side of the thumb pre-tensioner being fixed to the thumb cable part; wherein when tension of the thumb cable part decreases, the second side of the thumb pre-tensioner is configured to move toward the first side of the thumb pre-tensioner, and the thumb pre-tensioner comprises a spring member having a first end portion fixed to the thumb phalangeal part.

2. The robot hand module of claim 1, wherein:

the thumb pre-tensioner further comprises a catching member coupled to a second end portion of the spring member and is in contact with a part of the thumb cable part; and the thumb cable part is in contact with a region of the catching member that faces the second end portion of the spring member.

3. The robot hand module of claim 2, wherein the catching member is movably disposed in a space portion defined in the thumb phalangeal part and extends in a longitudinal direction thereof which is a direction in which the spring member extends.

4. The robot hand module of claim 3, wherein the space portion extends in the longitudinal direction obliquely with respect to a direction in which the thumb phalangeal part extends.

5. The robot hand module of claim 1, wherein the thumb phalangeal part further comprises:

a first thumb phalangeal member disposed adjacent to the palm part;

a second thumb phalangeal member having a first side rotatably coupled to the first thumb phalangeal member, wherein the thumb pre-tensioner is disposed in the second thumb phalangeal member;

a third thumb phalangeal member having a first side rotatably coupled to the second thumb phalangeal member;

a fourth thumb phalangeal member having a first side rotatably coupled to the third thumb phalangeal member; and a thumb insertion member having a first side coupled to the first thumb phalangeal member and a second side inserted and coupled into the palm part.

6. A robot hand module comprising:

a palm part; and a finger module coupled to the palm part, wherein:

the finger module comprises:

a finger phalangeal part movably coupled to the palm part;

a finger cable part having a first side coupled to the finger phalangeal part; and a finger driving part connected to a second side of the finger cable part and configured to operate the finger phalangeal part by extending the finger cable part to an outside or retracting the finger cable part, and the finger phalangeal part comprises:

a finger pre-tensioner configured to pull the finger cable part;

a first side of the finger pre-tensioner being fixed relative to the finger phalangeal part; and a second side of the finger pre-tensioner being fixed to the finger cable part, and the finger pre-tensioner comprises a spring member having a first end portion fixed relative to the finger phalangeal part.

7. The robot hand module of claim 6, wherein, when tension of the finger cable part decreases, the second side of the finger pre-tensioner is configured to move toward the first side of the finger pre-tensioner.

8. The robot hand module of claim 6, wherein:

the finger pre-tensioner further comprises a catching member coupled to a second end portion of the spring member and is configured to be in contact with a part of the finger cable part, and the finger cable part is in contact with a region of the catching member that faces the second end portion of the spring member.

9. The robot hand module of claim 8, wherein the catching member is movably disposed in a space portion defined in the finger phalangeal part and extends in a longitudinal direction thereof which is a direction in which the spring member extends.

10. The robot hand module of claim 9, wherein the space portion extends in the longitudinal direction that intersects a direction in which the finger phalangeal part extends.

11. The robot hand module of claim 10, wherein the spring member comprises:

a first region disposed in the space portion and having a first end portion fixed to the catching member; and a second region bent at a predetermined angle with respect to the first region and having a first end portion fixed relative to the finger phalangeal part.

12. The robot hand module of claim 11, wherein a width of a section in the space portion in which the first region and the second region meet together is smaller than a width of another section.

13. The robot hand module of claim 6, wherein the finger phalangeal part further comprises:

a first finger phalangeal member disposed adjacent to the palm part;

a second finger phalangeal member having a first side rotatably coupled to the first finger phalangeal member;

a third finger phalangeal member having a first side rotatably coupled to the second finger phalangeal member; and a finger insertion member having a first side coupled to the first finger phalangeal member and a second side inserted and coupled into the palm part, wherein the finger pre-tensioner is disposed in the finger insertion member.

14. A robot hand module comprising:

a palm part;

a thumb phalangeal part movably coupled to the palm part;

a thumb cable part having a first side connected to the thumb phalangeal part;

a thumb driving part connected to a second side of the thumb cable part and configured to operate the thumb phalangeal part by extending the thumb cable part to an outside or retracting the thumb cable part;

a thumb pre-tensioner configured to pull the thumb cable part, a first side of the thumb pre-tensioner being fixed relative to the thumb phalangeal part, and a second side of the thumb pre-tensioner being fixed to the thumb cable part;

a finger phalangeal part movably coupled to the palm part;

a finger cable part having a first side coupled to the finger phalangeal part;

a finger driving part connected to a second side of the finger cable part and configured to operate the finger phalangeal part by extending the finger cable part to the outside or retracting the finger cable part; and a finger pre-tensioner configured to pull the finger cable part, a first side of the finger pre-tensioner being fixed relative to the finger phalangeal part, and a second side of the finger pre-tensioner being fixed to the finger cable part, wherein the thumb phalangeal part comprises:
- a first thumb phalangeal member disposed adjacent to the palm part;
- a second thumb phalangeal member having a first side rotatably coupled to the first thumb phalangeal member, wherein the thumb pre-tensioner is disposed in the second thumb phalangeal member;
- a third thumb phalangeal member having a first side rotatably coupled to the second thumb phalangeal member;
- a fourth thumb phalangeal member having a first side rotatably coupled to the third thumb phalangeal member; and
- a thumb insertion member having a first side coupled to the first thumb phalangeal member and a second side inserted and coupled into the palm part.

15. The robot hand module of claim 14, wherein the finger phalangeal part comprises:
- a first finger phalangeal member disposed adjacent to the palm part;
- a second finger phalangeal member having a first side rotatably coupled to the first finger phalangeal member;
- a third finger phalangeal member having a first side rotatably coupled to the second finger phalangeal member; and
- a finger insertion member having a first side coupled to the first finger phalangeal member and a second side inserted and coupled into the palm part, wherein the finger pre-tensioner is disposed in the finger insertion member.

16. The robot hand module of claim 14, wherein the finger phalangeal part comprises:
- a first finger phalangeal member disposed adjacent to the palm part;
- a second finger phalangeal member having a first side rotatably coupled to the first finger phalangeal member;
- a third finger phalangeal member having a first side rotatably coupled to the second finger phalangeal member; and
- a finger insertion member having a first side coupled to the first finger phalangeal member and a second side inserted and coupled into the palm part, wherein the finger pre- tensioner is disposed in the finger insertion member.

\* \* \* \* \*